(12) United States Patent
Kawaguchi

(10) Patent No.: US 7,228,436 B2
(45) Date of Patent: Jun. 5, 2007

(54) SEMICONDUCTOR INTEGRATED CIRCUIT DEVICE, PROGRAM DELIVERY METHOD, AND PROGRAM DELIVERY SYSTEM

(75) Inventor: Kenichi Kawaguchi, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 769 days.

(21) Appl. No.: 10/611,879

(22) Filed: Jul. 3, 2003

(65) Prior Publication Data

US 2004/0088554 A1 May 6, 2004

(30) Foreign Application Priority Data

Oct. 31, 2002 (JP) ............................. 2002-318172

(51) Int. Cl.
*G06F 11/30* (2006.01)
(52) U.S. Cl. ...................... 713/189; 713/193; 380/277
(58) Field of Classification Search ................ 713/189, 713/193; 235/492; 380/277
See application file for complete search history.

(56) References Cited

U.S. PATENT DOCUMENTS 5,168,151 A * 12/1992 Nara ........................... 235/492
5,533,123 A * 7/1996 Force et al. ................. 713/189
5,623,637 A * 4/1997 Jones et al. ................. 711/164
6,003,134 A * 12/1999 Kuo et al. ..................... 726/20
6,069,952 A * 5/2000 Saito et al. .................... 705/57
6,438,694 B2 * 8/2002 Saito .......................... 713/189
6,907,526 B2 * 6/2005 Tanimoto et al. ........... 713/174
2002/0112173 A1 8/2002 Saito

FOREIGN PATENT DOCUMENTS

JP 8-30558 2/1996

* cited by examiner

*Primary Examiner*—Hosuk Song
*Assistant Examiner*—April Shan
(74) *Attorney, Agent, or Firm*—McDermott Will & Emery LLP

(57) ABSTRACT

When an encrypted program and a decryption program are inputted to a first memory, a semiconductor integrated circuit device causes a bus port to disable access from the outside and enables access to the first memory and to a second memory, thereby transferring the encrypted program and the decryption program from the first memory to the second memory. When the transfer is completed, the semiconductor integrated circuit device disables access to the first memory and gives, to a CPU, an instruction to decrypt the encrypted program by using a secret key held in a secret key holder and the decryption program and execute the decrypted program. After the execution of the decrypted program is completed, the semiconductor integrated circuit device disables access to the second memory.

8 Claims, 15 Drawing Sheets

FIG. 9

| RAM COPY FLAG 113F | 0 | 1 | 0 | 1 | 0 |
|---|---|---|---|---|---|
| DECRYPTION KEY DECRYPTION FLAG 704F | 0 | 1 | 1 | 0 | 0 |
| PROGRAM DECRYPTION EXECUTE FLAG 112F | 0 | 0 | 0 | 1 | 1 |
| BUS PORT 110d | OPEN | CLOSE | CLOSE | CLOSE | CLOSE |
| SECRET KEY ACCESS PORT 108d | CLOSE | CLOSE | OPEN | CLOSE | CLOSE |
| DECRYPTION KEY ACCESS PORT 703 | CLOSE | CLOSE | OPEN | CLOSE | OPEN |
| CHIP SELECT SIGNAL 116S | CS115 | ASSERT | NEGATE | ASSERT | NEGATE |
| CHIP SELECT SIGNAL 117S | NEGATE | ASSERT | CS115 | ASSERT | CS115 |

SEMICONDUCTOR INTEGRATED CIRCUIT DEVICE, PROGRAM DELIVERY METHOD, AND PROGRAM DELIVERY SYSTEM

BACKGROUND OF THE INVENTION

The present invention relates to a semiconductor LSI having the function of decrypting an encrypted program and executing the decrypted program which is mounted on information equipment or the like. More particularly, it relates to a processing system and method for encrypting a program and delivering the encrypted program from a device associated with a program owner to a device associated with a program user.

With the widespread use of information equipment capable of rewriting a program or executing a user program, a system for preventing illegal copying of software has been devised in recent years. In a method in which a program is encrypted and delivered, provision has been made to prevent the copying of a program for decrypting the encrypted program (hereinafter referred to as the "decryption program". For example, a decryption program is disposed in the internal memory of an LSI from which it cannot be read from the outside and the decrypted program is further protected from being read from the outside (see, e.g., Japanese Laid-Open Patent Publication No. HEI 8-30558).

FIG. 18 is a block diagram showing a conventional semiconductor integrated circuit device for executing an encrypted program.

The semiconductor integrated circuit device 1 shown in FIG. 18 has: a CPU 3; internal mimories 4 and 5 for inputting/outputting data via an internal bus 7; a bus port 6 for controlling the inputting/outputting of data to and from the outside via an external bus 2; an I/O port 9 connected to the CPU 3 via an I/O bus 8; a memory port 10 for controlling the internal RAM 5; and control registers 11 for controlling the memory port 10.

A decryption program for decrypting the encrypted program is stored in the internal ROM 4. The encrypted program is read in the internal RAM 5 and decrypted in accordance with the decryption program. The decrypted program is written in the internal RAM 5. The decrypted program written in the internal RAM 5 is protected from being read from the memory port 10 to the outside under the control of the control registers 11.

However, since the decryption program is kept in the LSI as described above, an internal nonvolatile memory should be provided in the LSI, which increases cost required for the LSI.

In addition, if a malicious program is encrypted, read in the LSI, and then executed, the decryption program may be transferred by the program to the outside and hacked. The use of the decryption program that has been hacked makes it possible to hack the encrypted program. Once the encrypted program is hacked, the LSI cannot be used any more since the decryption program cannot be changed.

A problem has also been encountered that an encryption program and an encryption strength cannot be selected by the encrypted program transferor.

SUMMARY OF THE INVENTION

It is therefore an object of the present invention to provide a lower-cost semiconductor integrated circuit device which allows a reduction in the probability that an encrypted program is hacked.

To solve the foregoing problems, a first semiconductor integrated circuit device according to the present invention comprises: a first memory for inputting and outputting data between a bus and itself; a second memory for inputting and outputting data between the bus and itself; a secret key holder for holding a secret key; a bus port for controlling access from outside to the bus; a CPU for storing an encrypted program and a decryption program in the first memory via the bus port, decrypting the encrypted program by using the decryption program and the secret key, and executing the decrypted program; and a controller for causing, when the encrypted program and the decryption program are stored in the first memory, the bus port to disable access from the outside, enabling access to the first and second memories, and thereby transferring the encrypted program and the decryption program from the first memory to the second memory, disabling access to the first memory when the transfer is completed, and disabling access to the second memory when the decryption and the execution of the decrypted program are completed.

With the first semiconductor integrated circuit device according to the present invention, it is no more necessary to provide the semiconductor integrated circuit device with an internal nonvolatile memory for keeping the decryption program so that a cost reduction is achieved. Moreover, the encrypted program can be decrypted and executed, while the program and data under decryption are not monitored from the outside. This reduces the probability that the encrypted program is hacked.

Preferably, the first semiconductor integrated circuit device according to the present invention further comprises: a secret key access port for controlling access from the CPU to the secret key holder, wherein the secret key access port enables access to the secret key holder when the transfer is completed and disables access to the secrete key holder when the execution of the decrypted program is completed.

In the first semiconductor integrated circuit device according to the present invention, the CPU preferably includes a register and erases data stored in the register if the execution of the decrypted program is completed.

In the first semiconductor integrated circuit device according to the present invention, the controller preferably controls access to the first and second memories by controlling chip select signals to the first and second memories.

In the first semiconductor integrated circuit device according to the present invention, the controller preferably includes a flag storing portion for storing first and second flags, enables access to the first and second memories when the first flag is set, disables access to the first memory when the first flag is reset and the second flag is set, and disables access to the second memory when each of the first and second flags is reset, the bus port preferably disables access from the outside when at least one of the first and second flags is set, and the CPU preferably sets the first and second flags when the encrypted program and the decryption program are inputted to the first memory, resets the first flag when the transfer is completed, and resets the second flag when the execution of the decrypted program is completed.

To solve the foregoing problems, a second semiconductor integrated circuit device according to the present invention comprises: a first memory for inputting and outputting data between a bus and itself, a second memory for inputting and outputting data between the bus and itself; a first memory port connected between the bus and the first memory to control access from the bus to the first memory; a second memory port connected between the bus and the second memory to control access from the bus to the second memory; a secret key holder for holding a secret key; a bus port for controlling access from outside to the bus; a CPU having a register, the CPU writing an encrypted program and a decryption program in the first memory via the bus port, decrypting the encrypted program by using the decryption program and the secret key, writing the decrypted program in the second memory, and executing the decrypted program; and a controller for causing, when the writing to the first memory is completed, the bus port to disable access from the outside to the bus, causing the first memory port to disable the writing to the first memory, and causing the second memory port to enable access to the second memory and causing, when the execution of the decrypted program is completed, the CPU to erase data stored in the register and disable access to the secrete key holder, while causing the second memory port to disable access to the second memory.

With the second semiconductor integrated circuit device according to the present invention, it is no more necessary to provide the semiconductor integrated circuit device with an internal nonvolatile memory for keeping the decryption program so that a cost reduction is achieved. Moreover, the encrypted program can be decrypted and executed, while the program and data under decryption are not monitored from the outside. This reduces the probability that the encrypted program is hacked.

To solve the foregoing problems, a third semiconductor integrated circuit device according to the present invention comprises: a first memory for inputting and outputting data between a bus and itself; a second memory for inputting and outputting data between the bus and itself; a memory port connected between the bus and the first memory to control access from the bus to the first memory; a secret key holder for holding a secret key; a bus port for controlling access from outside to the bus; a CPU having a register, the CPU writing an encrypted program and a decryption program in the first memory via the bus port, decrypting the encrypted program by using the decryption program and the secret key, writing the decrypted program in the second memory, and executing the decrypted program; and a controller including a memory initializer for erasing data in the second memory, the controller causing, when the wiring to the first memory is completed, the bus port to disable access from the outside to the bus and causing the memory port to disable the writing to the first memory and causing, when the execution of the decrypted program is completed, the CPU to erase data stored in the register and disable access to the secret key holder and causing the memory initializer to erase the data in the second memory.

With the third semiconductor integrated circuit device according to the present invention, it is no more necessary to provide the semiconductor integrated circuit device with an internal nonvolatile memory for keeping the decryption program so that a cost reduction is achieved. Moreover, the encrypted program can be decrypted and executed, while the program and data under decryption are not monitored from the outside. This reduces the probability that the encrypted program is hacked.

To solve the foregoing problems, a fourth semiconductor integrated circuit device according to the present invention comprises: a first memory for inputting and outputting data between a bus and itself; a second memory for inputting and outputting data between the bus and itself; a secret key holder for holding a secret key; a decryption key holder for holding a decryption key; a bus port for controlling access from outside to the bus; a CPU including a register, the CPU performing first storage for storing the encrypted decryption key and a decryption key decryption program in the first memory via the bus port, performing first decryption for decrypting the encrypted decryption key by using the decryption key decryption program and the secret key, writing the decrypted decryption key in the decryption key holder, performing second storage for storing an encrypted program and a decryption program in the first memory, performing decryption for decrypting the encrypted program by using the decryption program and the decrypted decryption key, and executing the decrypted program; and a controller for causing, when the first storage to the first memory is completed, the bus port to disable access from the outside to the bus and enabling access to the first and second memories such that the encrypted decryption key and the decryption key decryption program are transferred from the first memory to the second memory, enabling, when the transfer is completed, access to the secret key holder and disabling access to the first memory; causing, when the first decryption is completed, the CPU to erase data stored in register and disable access to the secret key holder, while disabling access to the second memory, enabling access to the first memory, and causing the bus port to enable access from the outside to the bus, causing, when the second storage to the first memory is completed, the bus port to disable access from the outside to the bus and enabling access to the second memory such that the encrypted program and the decryption program are transferred from the first memory to the second memory, enabling, when the transfer is completed, access to the decryption key holder and disabling access to the first memory, and causing, when the second decryption and the execution of the decrypted program are completed, the CPU to erase data stored in the register and disable access to the secret key holder and disabling access to the second memory.

With the fourth semiconductor integrated circuit device according to the present invention, it is no more necessary to provide the semiconductor integrated circuit device with an internal nonvolatile memory for keeping the decryption program so that a cost reduction is achieved. Moreover, the encrypted program can be decrypted and executed, while the program and data under decryption are not monitored from the outside. This reduces the probability that the encrypted program is hacked. In addition, the encryption program and the encryption strength can be selected at the encrypted program transferor.

To solve the foregoing problems, a first program delivery method according to the present invention is a program delivery method for delivering a program between a first device and a second device, the method comprising the steps of: transferring a public key from the second device to the first device; transferring a decryption program to the second device from the outside thereof, encrypting the program by using the public key in the first device and transferring the encrypted program to the second device; and decrypting the encrypted program by using a secret key corresponding to the public key and the decryption program in the second device.

In accordance with the first program delivery method of the present invention, it is no more necessary to provide the semiconductor integrated circuit device with an internal nonvolatile memory for keeping the decryption program so that a cost reduction is achieved. Moreover, the encrypted program can be decrypted and executed, while the program and data under decryption are not monitored from the outside. This reduces the probability that the encrypted program is hacked.

To solve the foregoing problems, a second program delivery method according to the present invention is a program delivery method for delivering a program between a first device and a second device, the method comprising the steps of: transferring a public key from the second device to the first device; encrypting a decryption key by using the public key in the first device and transferring the encrypted decryption key to the second device; decrypting the encrypted decryption key by using a secret key corresponding to the public key in the second device; encrypting the program by using an encryption key corresponding to the decryption key in the first device and transferring the encrypted program to the second device; and decrypting the encrypted program by using the decrypted decryption key in the second device.

In accordance with the second program delivery method of the present invention, it is no more necessary to provide the semiconductor integrated circuit device with an internal nonvolatile memory for keeping the decryption program so that a cost reduction is achieved. Moreover, the encrypted program can be decrypted and executed, while the program and data under decryption are not monitored from the outside. This reduces the probability that the encrypted program is hacked. In addition, the encryption program and the encryption strength can be selected at the encrypted program transferor.

To solve the foregoing problems, a first program delivery system according to the present invention is a program delivery system for delivering a program, the system comprising: a first device and a second device, the first device encrypting the program by using a public key and transferring the encrypted program to the second device and the second device decrypting the program encrypted by the first device by using a secret key corresponding to the public key and a decryption program transferred from the outside of the second device.

In accordance with the first program delivery system of the present invention, it is no more necessary to provide the semiconductor integrated circuit device with an internal nonvolatile memory for keeping the decryption program so that a cost reduction is achieved. Moreover, the encrypted program can be decrypted and executed, while the program and data under decryption are not monitored from the outside. This reduces the probability that the encrypted program is hacked.

To solve the foregoing problems, a second program delivery system according to the present invention is a program delivery system for delivering a program, the system comprising: a first device and a second device, the first device encrypting a decryption key by using a public key, transferring the encrypted decryption key to the second device, encrypting the program by using an encryption key corresponding to the decryption key, and transferring the encrypted program to the second device, the second device decrypting the decryption key encrypted by the first device by using a secret key corresponding to the public key and decrypting the program encrypted by the first device by using the decrypted decryption key.

In accordance with the second program delivery system of the present invention, it is no more necessary to provide the semiconductor integrated circuit device with an internal nonvolatile memory for keeping the decryption program so that a cost reduction is achieved. Moreover, the encrypted program can be decrypted and executed, while the program and data under decryption are not monitored from the outside. This reduces the probability that the encrypted program is hacked. In addition, the encryption program and the encryption strength can be selected at the encrypted program transferor.

BRIEF DESCRIPTION OF THE DRAWINGS

FIG. 9 is a view showing correlations among the respective states of flags, a bus port, and chip select signals;

DETAILED DESCRIPTION OF THE INVENTION

Figure 1:
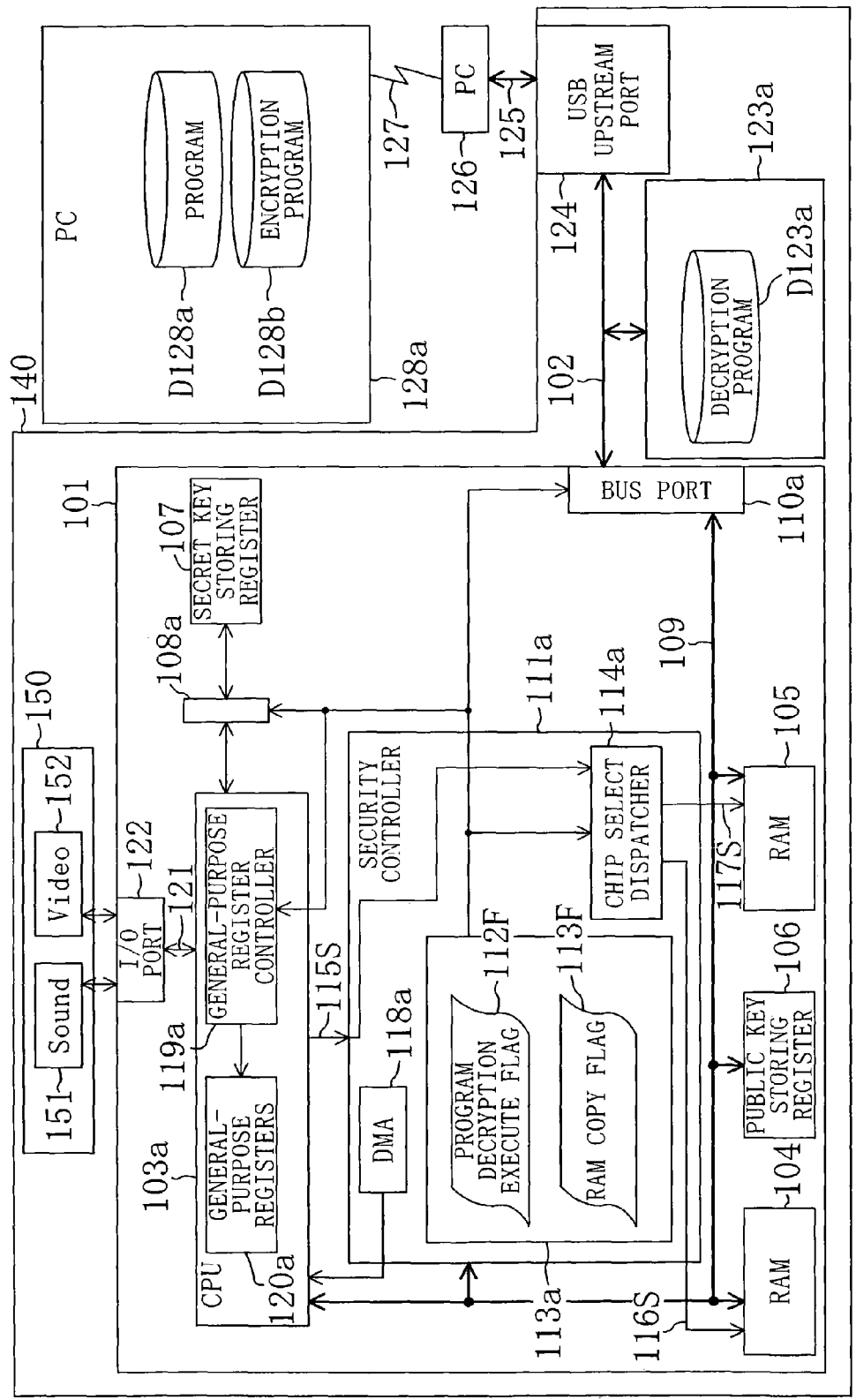
FIG. 1 is a block diagram for illustrating a structure of a semiconductor integrated circuit device in a first embodiment of the present invention.

Referring to the drawings, the individual embodiments of the present invention will be described herein below.

EMBODIMENT 1

FIG. 1 is a block diagram for illustrating a structure of a semiconductor integrated circuit device 101 in a first embodiment of the present invention.

As shown in FIG. 1, an encrypted program is transferred from a PC 128*a* (corresponding to a first device) which is a device at a program developer to a program user via a PC 126. In the semiconductor integrated circuit device 101 (corresponding to a second device) within information equipment 140 at the user, the encrypted program is decrypted by using a secret key and a decryption program.

The PC 128*a* is a device at the program developer and keeps a program D128*a* and an encryption program 128*b* for encrypting a program.

The information equipment 140 is equipment at the program user and has: the semiconductor integrated circuit device 101; a flash memory 123*a* for keeping a decryption program D123a; a USB upstream port 124; and peripheral equipment 150. An outer bus 102 provides connection among the semiconductor integrated circuit 101, the flash memory 123a, and the USB upstream port 124.

The semiconductor integrated circuit device has: a CPU 103a; internal RAMs 104 (corresponding to a first memory) and 105 (corresponding to a second memory); a public key storing register 106; a bus port 110a; a security controller 111a; and an I/O port 122. The internal bus 109 is connected in the manner as shown in the drawing.

The CPU 103a has a general-purpose register controller 119a and general-purpose registers 120a.

The security controller 111a has a flag storing portion 113a for storing a program decryption execute flag 112F (corresponding to a second flag) and a RAM copy flag 113F (corresponding to a first flag), a chip select dispatcher 114a, and a DMA controller 118a.

A specific description will be given to the respective contents and operations of the individual elements.

The external bus 102 is used to transfer a public key stored in the public key storing register 106 to the personal computer 128a and transfer a program encrypted by using the public key and the encryption program D128b to the semiconductor integrated circuit device 101.

The CPU 103a operates in accordance with a program stored in the internal RAMs 104 and 105 or in the flash memory 123a. The CPU 103a not only operates a normal program but also decrypts an encrypted program and executes the decrypted program. The CPU 103a also transfers the encrypted program inputted from the outside and the decryption program D123a to the internal RAM 104.

The internal RAM 104 is a memory used during a normal operation, i.e., when either of the decryption program D123a and the decrypted program is not executed. A description will be given to the case where a program encrypted by using the public key and the encryption program D128b is decrypted and executed. First, the encrypted program and the decryption program D123a in the flash memory 123a are transferred by the CPU 103a to the internal RAM 104 in the state in which the external bus 102 and the internal bus 109 are connected to each other by the bus port 110a. Then, after the bus port 110a disconnects the external bus 102 and the internal bus 109 from each other, the encrypted program and the decryption program D123a are transferred by the DMA controller 118a from the internal RAM 104 to the internal RAM 105. Thereafter, the security controller 111a disables access from the internal bus 109 to the internal RAM 104 until the execution of the decrypted program is completed.

The internal RAM 105 is used during the execution of the decryption program D123a and during the execution of the decrypted program. A description will be given to the case where the encrypted program is decrypted and executed. After the bus port 110a disconnects the external bus 102 and the internal bus 109 from each other, the encrypted program and the decryption program D123a are transferred by the DMA controller 118a from the internal RAM 104 to the internal RAM 105. In the state in which the external bus 102 and the internal bus 109 are connected to each other by the bus port 110a, the security controller 111a disables access from the internal bus 109 to the internal RAM 105. Accordingly, the decrypted program temporarily stored in the internal RAM 105 and data during the execution of a decryption process are not monitored from the outside.

The public key storing register 106 is a register storing therein a public key, which is used only for reading. The public key is transferred to the personal computer 128a disposed outside the semiconductor integrated circuit device 101 and used when the program D128a is encrypted in accordance with the encryption program D128b.

The secret key storing register 107 is a register storing therein a secret key, which is used only for reading. The secret key is used when the encrypted program is decrypted in accordance with the decryption program D123a.

The secret key access port 108a enables the CPU 103a to read the secrete key from the secret key storing register 107 only while the RAM copy flag 113F is reset. Specifically, the secret key access port 108a enables the CPU 103a to read the secret key from the secret key storing register 107 only while the program is decrypted, the decrypted program is executed after the decryption program D123a is initiated, the transfer of the encrypted program and the decryption program D123a from the internal RAM 104 to the internal RAM 105 is completed, and the RAM copy flag 113F is reset. At any time other than the above, the secret key access port 108a disables the reading of the secret key.

The internal bus 109 is used to transfer a program and data within the semiconductor integrated circuit device 101.

The bus port 110a disconnects the internal bus 109 and the external bus 102 from each other if at least one of the program decryption execute flag 112F and the RAM copy flag 113F is set. Accordingly, the internal bus 109 and the internal RAM 105 are not monitored from the outside during the transfer of the encrypted program and the decryption program D123a and during the execution of the decryption program D123a and the decrypted program. In any case other than the above, the internal bus 109 and the external bus 102 are connected to each other.

The security controller 111a is internally provided with the flag storing portion 113a for keeping the program decryption execute flag 112F and the RAM copy flag 113F, with the chip select dispatcher 114a, and with the DMA controller 118. The security controller 111a controls the bus port 110a, the secret key access port 108a, chip select signals 116S and 117S, and the general-purpose register controller 119a in decrypting the program encrypted by using the encryption program D128b and the public key stored in the public key storing register 106 and executing the decrypted program.

A description will be given to the case where the program encrypted by the encryption program D128b is decrypted and executed. First, when the encrypted program and the decryption program D123a are transferred by the CPU 103a to the internal RAM 104 in the state in which the external bus 102 and the internal bus 109 are connected to each other by the bus port 110a, the bus port 110a then disconnects the external bus 102 and the internal bus 109 from each other. Then, the chip select dispatcher 114a asserts the chip select signals 116S and 117S such that the program encrypted by the DMA controller 118a and the decryption program D123a are transferred from the internal RAM 104 to the internal RAM 105. When the transfer is completed, the chip select dispatcher 114a negates the chip select signal 116S and then shifts to the control of the CPU 103a. When the program is decrypted in the CPU 103a and the execution of the decrypted program is completed, a completion notice is given to the chip select dispatcher 114a. Upon receipt of the notice, the chip select dispatcher 114a generates the chip select signal 117S, causes the general-purpose register controller 119a to initialize the general-purpose registers 120a, and outputs the chip select signal 115S from the CPU 103a as the chip select signal 116S. Thereafter, the bus port 110a connects the internal bus 109 and the external bus 102 to each other.

The program decryption execute flag 112F is set by the CPU 103a at the initiation of the decryption program D123a and reset by the CPU 103a at the completion of the execution of the decrypted program. The decryption program D123a is initiated, the transfer of the encrypted program and the decryption program D123a from the internal RAM 104 to the internal RAM 105 is completed, and the RAM copy flag 113F is reset. While the encrypted program is decrypted and the decrypted program is executed thereafter, access to the internal RAM 104 is disabled, while access to the internal RAM 105 and to the secret key storing register 107 is enabled. When the program decryption execute flag 112F is reset, access to the internal RAM 105 and to the secret key storing register 107 is disabled.

The RAM copy flag 113F is set by the CPU 103a at the initiation of the decryption program D123a and reset at the completion of data transfer from the internal RAM 104 to the internal RAM 105. Since the internal RAMs 104 and 105 are at the same location on a memory map, the respective chip select signals to the internal RAMs 104 and 105 are not normally asserted simultaneously. However, each of the chip select signals 116S and 117S from the chip select dispatcher 114a to the internal RAMs 104 and 105 is asserted by setting the RAM copy flag 113F when the encrypted program or the like is to be transferred from the internal RAM 104 to the internal RAM 105.

The chip select dispatcher (hereinafter referred to as "CS dispatcher") 114a asserts each of the chip select signals 116S and 117S when the RAM copy flag 113F is set, thereby enabling the DMA controller 118a to transfer the encrypted program and the decryption program D123a from the internal RAM 104 to the internal RAM 105. When the program decryption execute flag 112F is set and the RAM copy flag 113F is reset, the CS dispatcher 114a negates the chip select signal 116S and transfers the chip select signal 115S as the chip select signal 117S. This enables access to the internal RAM 105 during the decryption of the encrypted program and during the execution of the decrypted program. In any case other than those mentioned above, the CS dispatcher 114a transfers the chip select signal 115S as the chip select signal 116S and negates the chip select signal 117S, thereby disabling access to the internal RAM 105 during a normal operation, i.e., when either of the decryption program D123a and the decrypted program is not executed.

The chip select signal 115S is outputted from the CPU 103a and asserted when the internal RAM 104 or the internal RAM 105 is to be accessed.

The chip select signals 116S and 117S are outputted from the CS dispatcher 114a. The chip select signal 116S is asserted when the internal RAM 104 is to be accessed. The chip select signal 117S is asserted when the internal RAM 105 is to be accessed.

When the RAM copy flag 113F is set, the DMA controller 118a transfers the encrypted program and the decryption program D123a from the internal RAM 104 to the internal RAM 105. When the transfer is completed, the RAM copy flag 113 is reset.

The general-purpose register controller 119a resets the general-purpose registers 120a when the program decryption execute flag 112F is reset. During the decryption of the encrypted program, therefore, data generated in the general-purpose registers 120a during the execution of the decrypted program is not monitored from the outside.

The I/O port 122 is connected to the CPU 103a via the I/O bus 121. The I/O port 122 is also connected to an external circuit such as a sound module 151 or a video module 152 in the peripheral equipment 150.

The flash memory 123a keeps the decryption program D123a.

The decryption program D123a is transferred to the internal RAM 105 via the internal RAM 104 within the semiconductor integrated circuit device 101 and used in conjunction with the secret key stored in the secret key storing register 107 when the encrypted program is decrypted.

The USB upstream port 124 is connected to the personal computer 126 via a USB cable 125 and used to transfer the encrypted program to the semiconductor integrated circuit device 101.

The USB cable 125 is used to transfer the encrypted program from the personal computer 126 to the USB upstream port 124.

The personal computer 126 receives the encrypted program from the personal computer 128a and transfers the encrypted program to the information equipment 140 on which the semiconductor integrated circuit device 101 is mounted.

A network line 127 is used to transfer the encrypted program from the personal computer 128 to the personal computer 126.

The personal computer 128 receives the public key stored in the public key storing register 106 from the personal computer 126 via the network line 127, encrypts the program D128a by using the encryption program D128b and the public key, and transfers the encrypted program to the personal computer 126 via the network line 127.

The program 128a is encrypted by using the encryption program D128b and the public key stored in the public key storing register 106 and then transferred to the semiconductor integrated circuit device 101 via the network line 127, the personal computer 126, the USB cable 125, the USB upstream port 124, and the external bus 102. The encrypted program 128a is decrypted in the semiconductor integrated circuit device 101 by using the decryption program D123a and the secret key stored in the secret key storing register 107.

A reference numeral D128b denotes an encryption program for encrypting the program D128a by using the public key stored in the public key storing register 106.

The information equipment 140 has: the semiconductor integrated circuit device 101; the peripheral equipment 150; the flash memory 123a; and the USB upstream port 124.

The peripheral equipment 150 has: the sound module 151; and the video module 152 and is connected to the I/O port 122 in the semiconductor integrated circuit device 101.

The sound module 151 is connected to the I/O port 122 of the semiconductor integrated circuit device 101 to perform reproduction, recording, and the like of a sound through the transmission and reception of transferred data and the reception of a control signal.

The video module 152 is connected to the I/O port 122 of the semiconductor integrated circuit device 101 to perform reproduction of a dynamic picture image through the transmission and reception of transferred data and the reception of a control signal.

Figure 2:
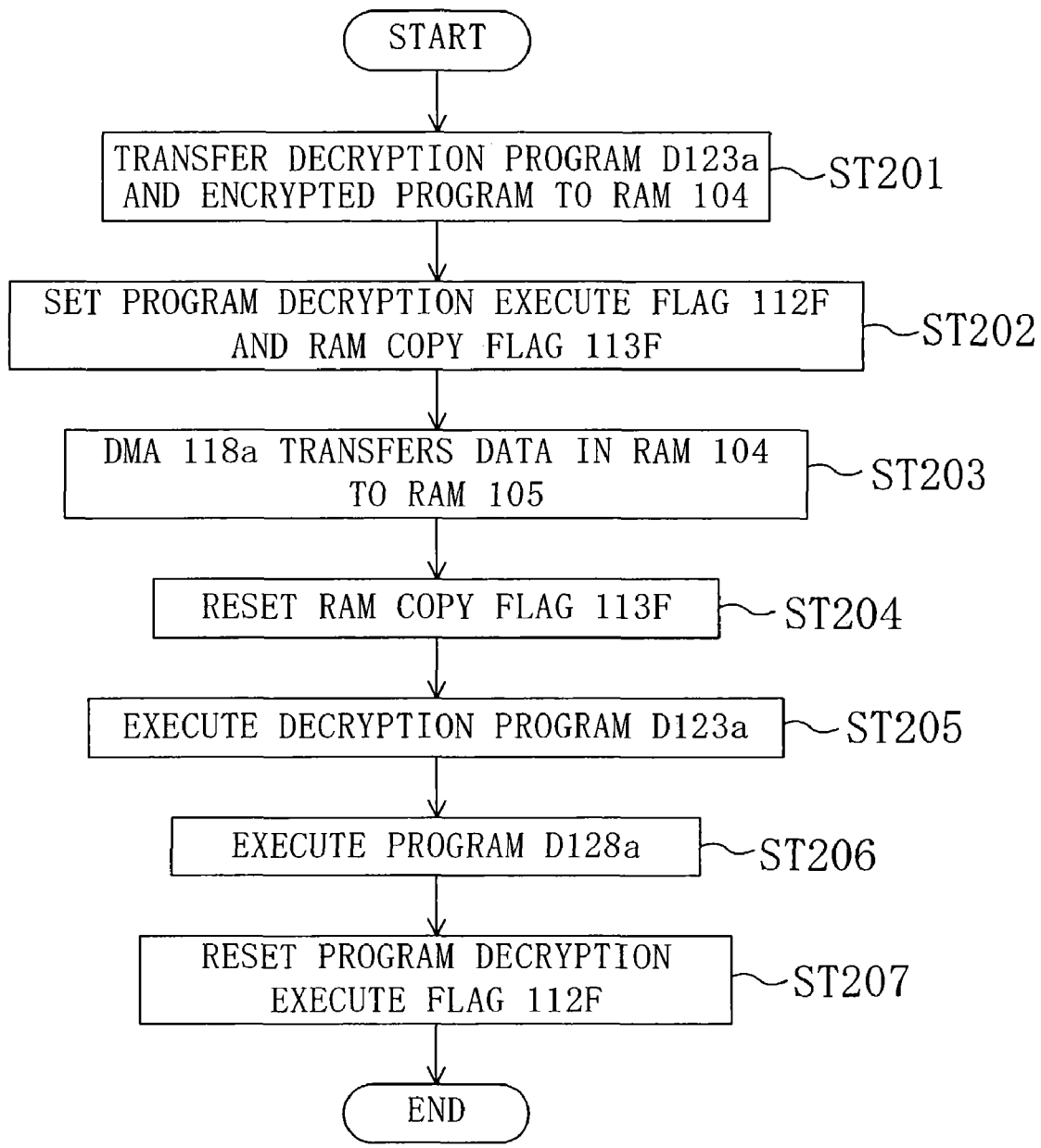
FIG. 2 is a flow chart showing the procedure of decrypting an encrypted program.

Referring to FIG. 2, the outline of the procedure of decrypting the encrypted program to generate the program D128a and executing the program D128a will be described.

FIG. 2 is a flow chart showing the procedure of decrypting the encrypted program in the first embodiment.

First, in Step ST201, the CPU 103a transfers the decryption program D123a and the encrypted program to the internal RAM 104.

When the transfer is completed, the whole process then advances to Step ST202 where the CPU 103a sets the program decryption execute flag 112F and the RAM copy flag 113F. At this time, the bus port 110a disconnects the internal bus 109 and the external bus 102 from each other.

After the disconnection, the whole process then advances to Step ST203 where the DMA controller 118a transfers the decryption program D123a and the encrypted program in the internal RAM 104 to the internal RAM 105.

When the transfer is completed, the whole process then advances to Step ST204 where the CPU 103a resets the RAM copy flag 113F. From the resetting of the RAM copy flag 113F on till the completion of Step ST206, which will be described later, the CS dispatcher 114a does not assert the chip select signal 116S.

The whole process then advances to Step ST205 where the CPU 103a executes the decryption program D123a, decrypts the encrypted program by using the secret key stored in the secret key storing register 107 to generate the program D128a, and writes the generated program D128a in the internal RAM 105.

The whole process then advances to Step ST206 where the CPU 103a executes the program D128a.

Finally, the whole process advances to Step ST207 where the CPU 103a resets the program decryption execute flag 112F. When the program decryption execute flag 112F is reset, the general-purpose register controller 119a resets the general-purpose registers 120a. When the program decryption execute flag 112a is reset, the bus port 110a connects the internal bus 109 and the external bus 102 to each other, while the CS dispatcher 114a outputs the chip select signal 116S as the chip select signal 115S and negates the chip select signal 117S.

Since the chip select signal 116S is not asserted while the decryption program D123a is executed and the program D128a is generated, the data and program D128a under decryption are not stored in the internal RAM 104. Since the chip select signal 117S is negated while the external bus 102 and the internal bus 109 are connected to each other by the bus port 110a, the data and program D128a under decryption is prevented from being monitored from the outside.

Thus, according to the first embodiment, it is no more necessary to provide the semiconductor integrated circuit device with an internal nonvolatile memory for keeping the decryption program so that a cost reduction is achieved. Moreover, the encrypted program can be decrypted and executed, while the program and data under decryption are not monitored from the outside. This reduces the probability that the encrypted program is hacked.

EMBODIMENT 2

Figure 3:
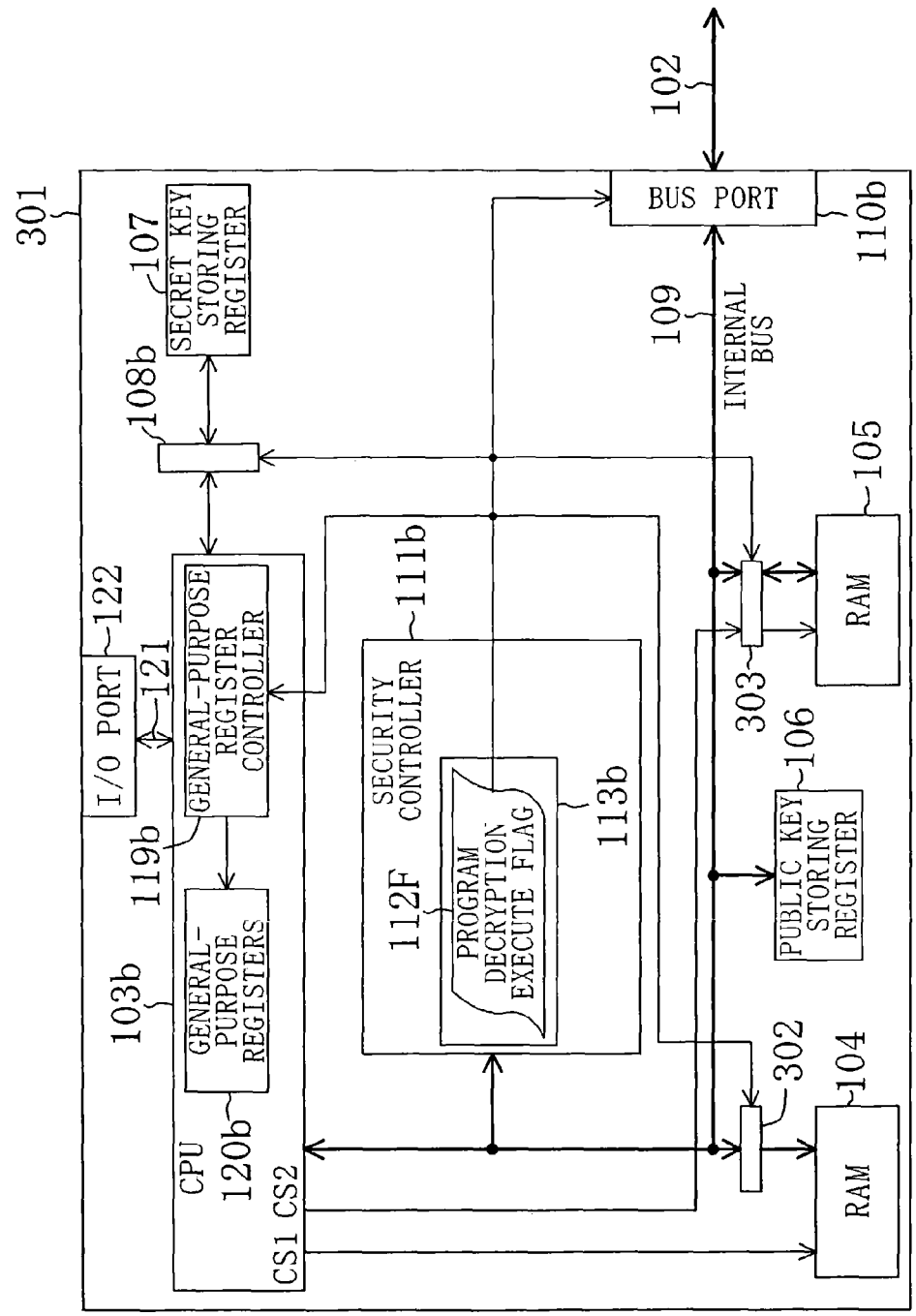
FIG. 3 is a block diagram for illustrating a structure of a semiconductor integrated circuit device in a second embodiment of the present invention.

FIG. 3 is a block diagram showing a structure of a semiconductor integrated circuit device 301 according to a second embodiment of the present invention.

A semiconductor integrated circuit 301 shown in FIG. 3 is different from the semiconductor integrated circuit device 101 shown in FIG. 1 in that it further comprises a memory port 302 (corresponding to a first memory port) and a memory port 303 (corresponding to a second memory port). The semiconductor integrated circuit device 301 is also different from the semiconductor integrated circuit device 101 in that a security controller 111b has only a flag storing portion 113b for storing the program decryption execute flag 112F. As for the other components, they operate similarly to the components shown in FIG. 1 so that the description thereof will not be repeated.

The memory port 302 halts writing to the internal RAM 104 under the control of the security controller when the program decryption execute flag 112F is set. In other words, data cannot be written in the internal RAM 104 during the decryption of the program and during the execution of the decrypted program.

The memory port 303 halts access to the internal RAM 105 under the control of the security controller 111b when the program decryption execute flag 112F is reset. In other words, the internal RAM 105 cannot be accessed during the internal bus 109 and the external bus 102 are connected to each other by a bus port 110b. Accordingly, the decrypted program and data during the execution of a decryption process, which are written in the internal RAM 105, are not monitored from the outside.

A description will be given next to the procedure of decrypting the encrypted program to generate the program D128a and executing the program D128a.

Figure 4:
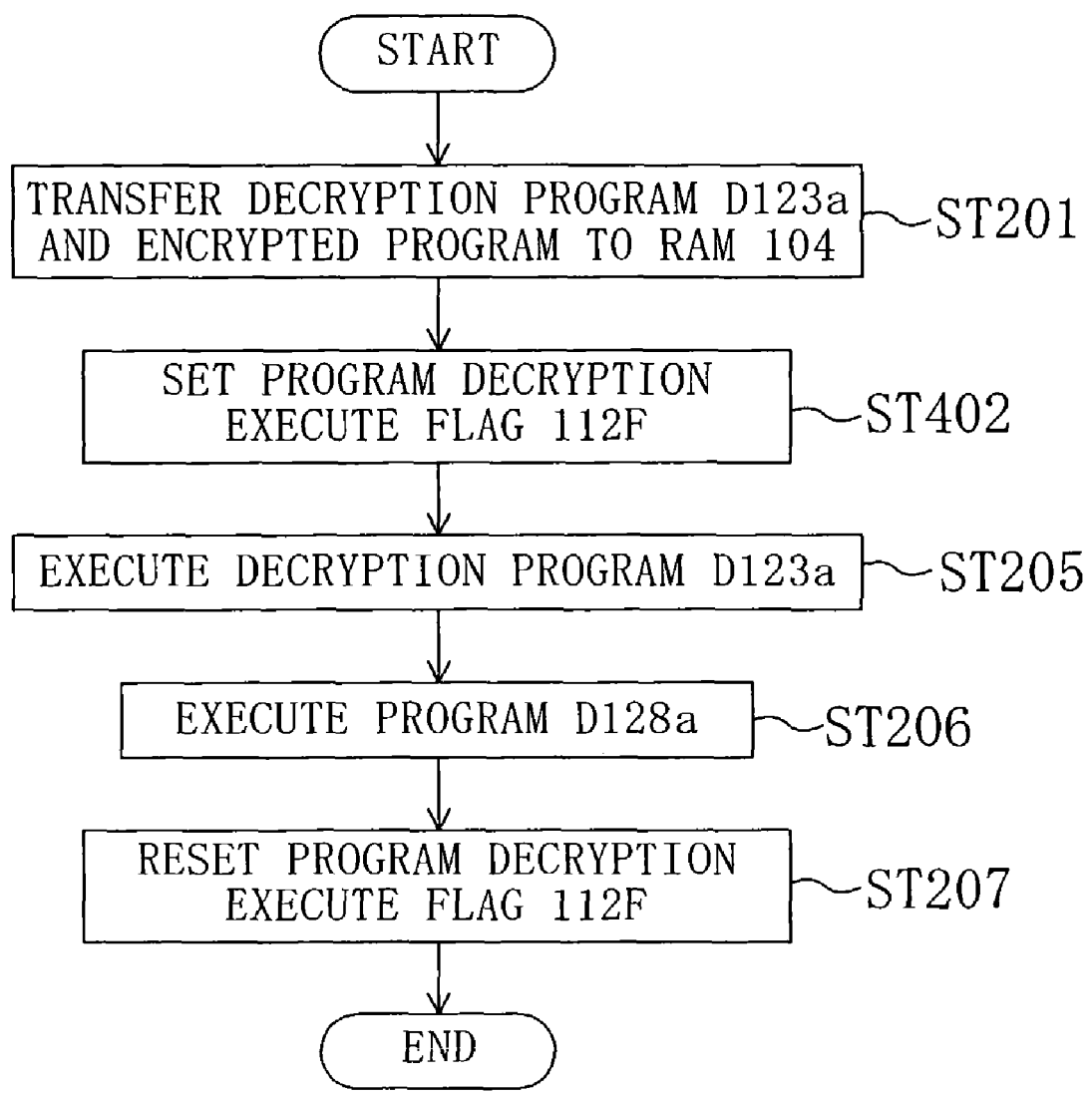
FIG. 4 is a flow chart showing the procedure of decrypting an encrypted program.

FIG. 4 is a flow chart showing the procedure of decrypting the encrypted program in the second embodiment.

First, in Step ST201, a CPU 103b transfers the decryption program D123a and the encrypted program to the internal RAM 104.

When the transfer is completed, the whole process then advances to ST402 where the CPU 103b sets the program decryption execute flag 112F. At this time, the bus port 110b disconnects the internal bus 109 and the external bus 102 from each other. The memory port 302 halts writing to the internal RAM 104, while the memory port 303 enables access to the internal RAM 105.

Then, the whole process advances to Step ST205 where the CPU 103b executes the decryption program D123a, thereby decrypts the encrypted program by using the secret key stored in the secrete key storing register 107 to generate the program D128a, and writes the generated program D128a in the internal RAM 105.

Then, the whole process advances to Step ST206 where the CPU 103b executes the program D128a.

Finally, when the execution of the program D128a is completed, the whole process advances to Step ST207 where the program decryption execute flag 112F is reset. When the program decryption execute flag 112F is reset, the general-purpose register controller 119b resets the general-purpose registers 120b under the control of the security controller 111b. When the program decryption execute flag 112F is reset, the bus port 110b connects the internal bus 109 and the external bus 102 to each other, while the memory port 302 enables writing to the internal RAM 104 and the memory port 303 halts access to the internal RAM 105.

In the semiconductor integrated circuit device 301, the memory port 302 executes the decryption program D123a and halts writing to the internal RAM 104 while the program D128a is generated so that the data and program D128a under decryption are not stored in the internal RAM 104. In addition, the memory port 303 halts access to the internal RAM 105 while the external bus 102 and the internal bus 109 are connected to each other by the bus port 110b so that the data and program D128a under decryption are not outputted to the outside.

Thus, according to the second embodiment, it is no more necessary to provide the semiconductor integrated circuit device with an internal nonvolatile memory for keeping the decryption program so that a cost reduction is achieved. Moreover, the encrypted program can be decrypted and executed, while the program and data under decryption are not monitored from the outside. This reduces the probability that the encrypted program is hacked.

EMBODIMENT 3

Figure 5:
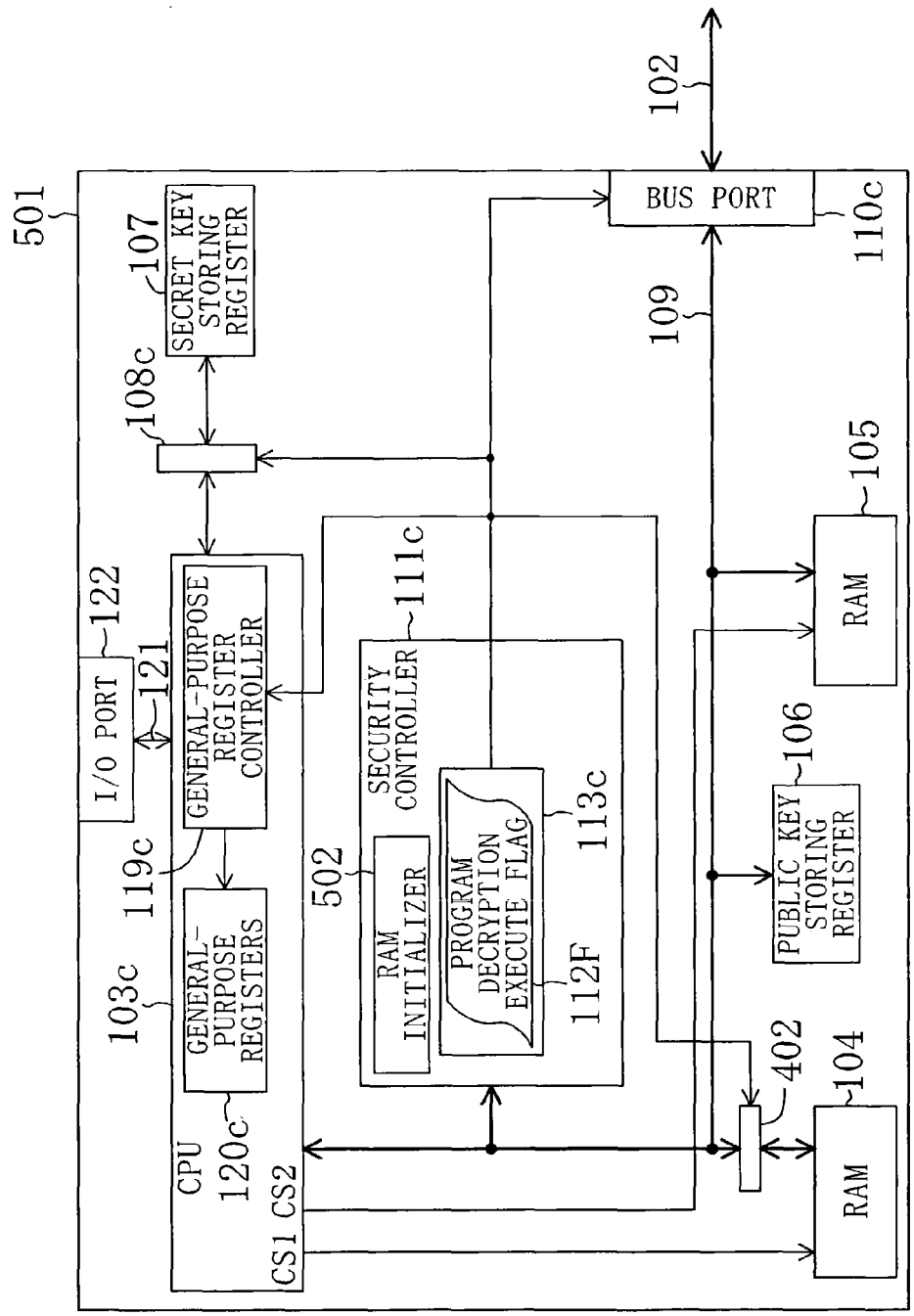
FIG. 5 is a block diagram for illustrating a structure of a semiconductor integrated circuit device in a third embodiment of the present invention.

FIG. 5 is a block diagram showing a structure of a semiconductor integrated circuit device 501 according to a third embodiment of the present invention.

A semiconductor integrated circuit device 501 shown in FIG. 5 is different from the semiconductor integrated circuit device 101 shown in FIG. 1 in that it further comprises a memory port 402. The semiconductor integrated circuit device 501 is also different from the semiconductor integrated circuit device 101 shown in FIG. 1 in that a security controller 111c has a flag storing portion 113c for storing the program decryption execute flag 112F and a RAM initializer 502 (corresponding to a memory initializer). As for the other components, they operate similarly to the components shown in FIG. 1 so that the description thereof will not be repeated.

Immediately before the program decryption execute flag 112F is reset, the RAM initializer 502 writes "1" in each of the regions of the internal RAM 105 to erase data, thereby preventing the decrypted program and the data under decryption, which are written in the internal RAM 105, from being monitored from the outside.

A description will be given next to the procedure of decrypting the encrypted program to generate the program D128a and executing the program D128a.

Figure 6:
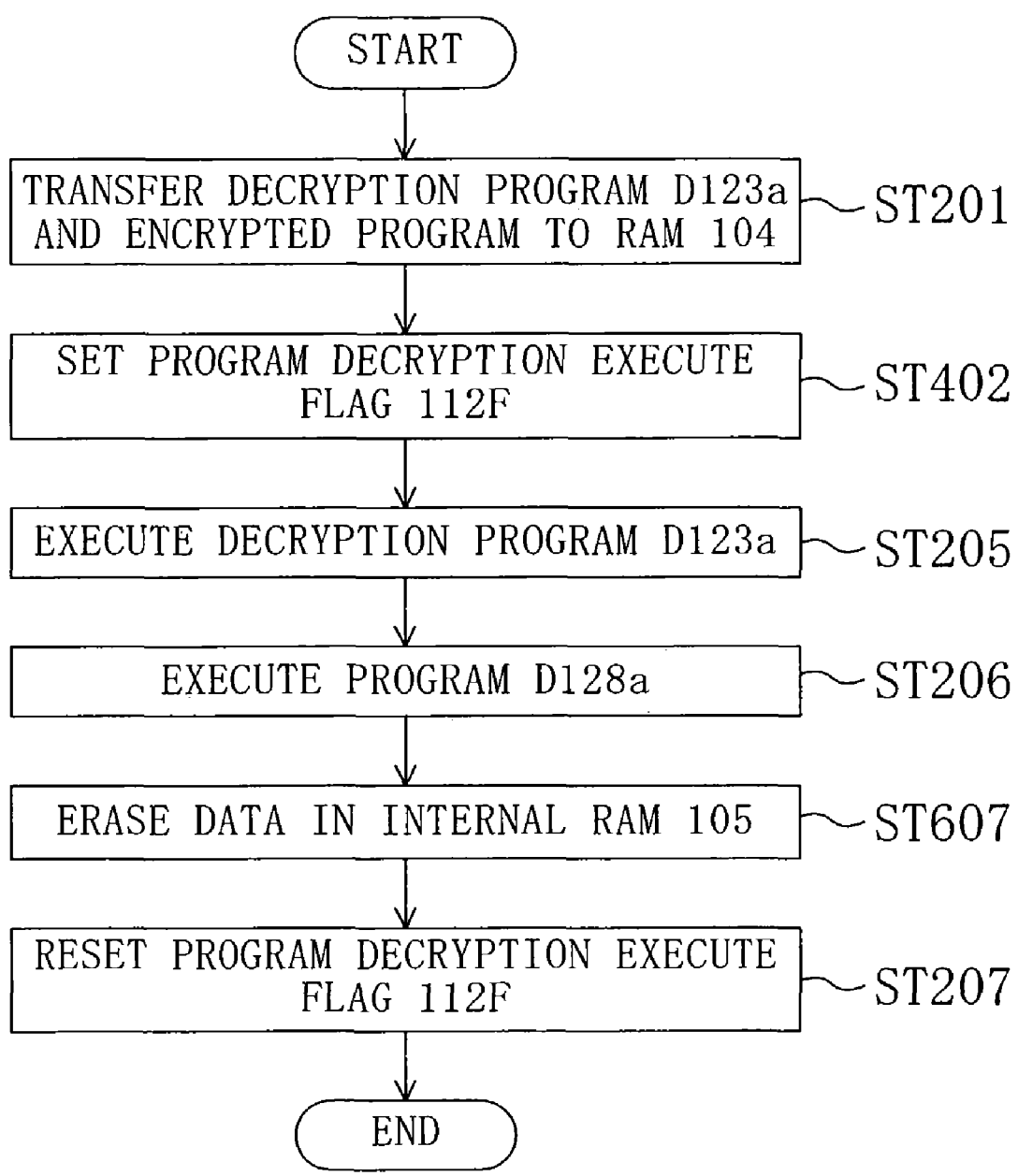
FIG. 6 is a flow chart showing the procedure of decrypting an encrypted program.

FIG. 6 is a flow chart showing the procedure of decrypting the encrypted program in the third embodiment.

First, in Step ST201, a CPU 103c transfers the decryption program D123a and the encrypted program to the internal RAM 104.

When the transfer is completed, the whole process then advances to ST402 where the CPU 103c sets the program decryption execute flag 112F. At this time, a bus port 110c disconnects the internal bus 109 and the external bus 102 from each other, while the memory port 402 halts writing to the internal RAM 104 under the control of the security controller 111c.

Then, the whole process advances to Step ST205 where the CPU 103c executes the decryption program D123a, thereby decrypts the encrypted program by using the secret key stored in the secrete key storing register 107 to generate the program D128a, and writes the generated program D128a in the internal RAM 105.

When the generated program D128a is written in the internal RAM 105, the whole process then advances to Step ST206 where the CPU 103c executes the program D128a.

The whole process then advances to Step ST607 where the RAM initializer 502 writes "1" in each of the regions of the internal RAM 105 to erase data.

Finally, when the data in the internal RAM 105 is erased, the whole process advances to Step ST207 where the program decryption execute flag 112F is reset. When the program decryption execute flag 112F is reset, the general-purpose register controller 119c resets the general-purpose registers 120c under the control of the security controller 111b. When the program decryption execute flag 112F is reset, the bus port 110c connects the internal bus 109 and the external bus 102 to each other, while the memory port 402 enables writing to the internal RAM 104 under the control of the security controller 111c.

In the semiconductor integrated circuit device 501, the memory port 402 executes the decryption program D123a and halts writing to the internal RAM 104 while the program D128a is generated so that the data and program D128a under decryption are not stored in the internal RAM 104. In addition, the RAM initializer 502 has completely erased data in the internal RAM 105 immediately before the bus port 110c brings the external bus 102 and the internal bus 109 in the disconnected state into the connected state so that the data and program D128a under decryption are not outputted to the outside.

Thus, according to the third embodiment, it is no more necessary to provide the semiconductor integrated circuit device with an internal nonvolatile memory for keeping the decryption program so that a cost reduction is achieved. Moreover, the encrypted program can be decrypted and executed, while the program and data under decryption are not monitored from the outside. This reduces the probability that the encrypted program is hacked.

EMBODIMENT 4

Figure 7:
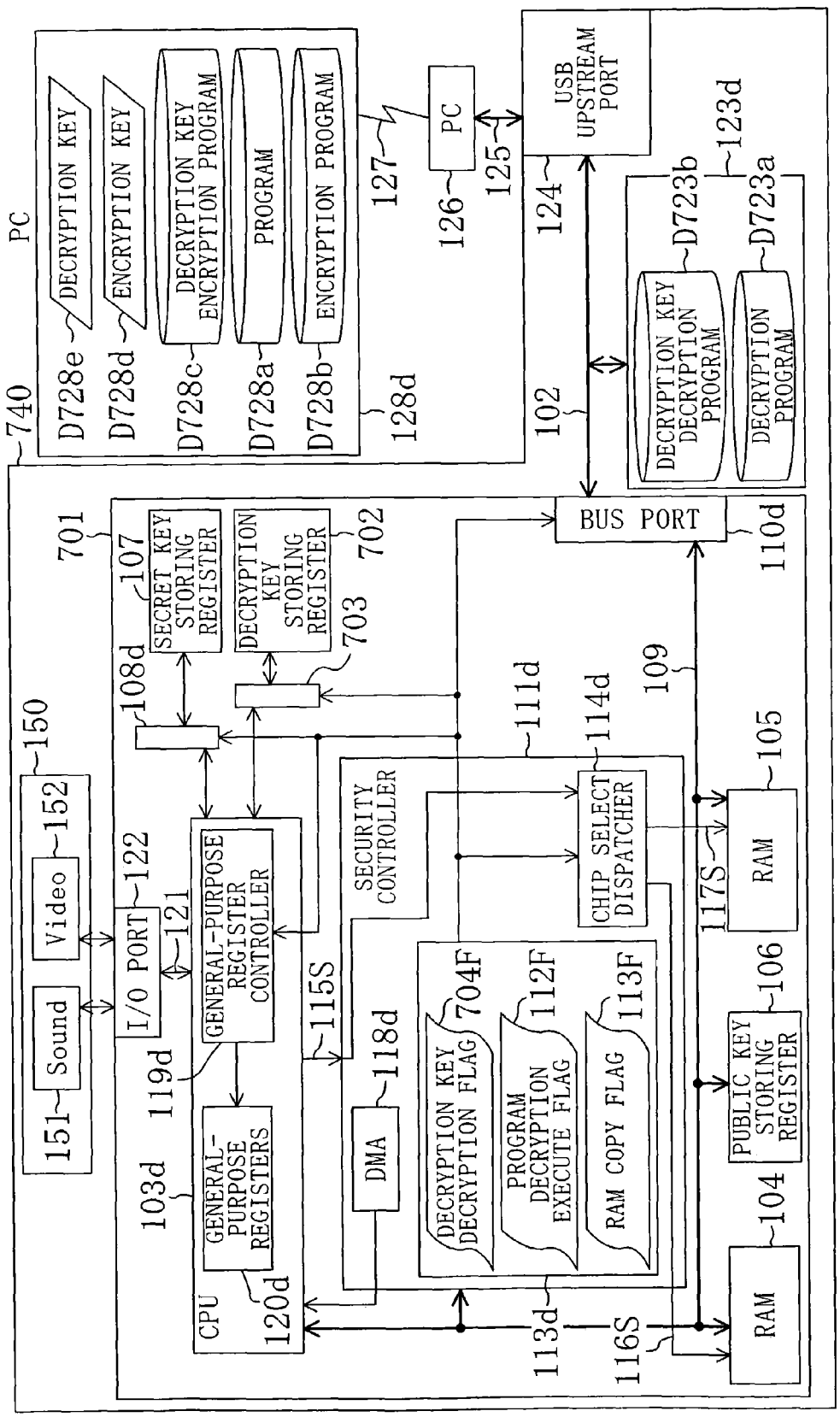
FIG. 7 is a block diagram for illustrating a structure of a semiconductor integrated circuit device in a fourth embodiment of the present invention.

FIG. 7 is a block diagram showing a structure of a semiconductor integrated circuit device 701 according to a fourth embodiment of the present invention.

A semiconductor integrated circuit device 701 shown in FIG. 7 is different from the semiconductor integrated circuit device 101 shown in FIG. 1 in that it further comprises a decryption key access port 703 and a decryption key storing register 702. A PC 128d is different from the PC 128a shown in FIG. 1 in that it keeps a decryption key encryption program D728c, an encryption key D728d, and a decryption key D728e in addition to the program D728a and the encryption program D728b. A flag storing portion 113d is different from the flag storing portion 113a shown in FIG. 1 in that it keeps a decryption key decryption flag 704F in addition to the program decryption execute flag 112F and the RAM copy flag 113F. A flash memory 123d is different from the flash memory 123a in that it keeps a decryption key decryption program D723b in addition to the decryption program 723a. As for the other components, they operate similarly to the components shown in FIG. 1 so that a description will be given with particular emphasis on different portions between FIGS. 7 and 1.

A CPU 103d operates in accordance with a program stored in the internal RAM 104 or 105 or in the flash memory 123d. Besides operating a normal program, the CPU 103d executes the decryption of the encrypted decryption key and the decryption of the encrypted program as well as the decrypted program. The CPU 103d also transfers the encrypted decryption key inputted from the outside, the encrypted program, the decryption key encryption program D723b, and the decryption program D723a to the internal RAM 104.

The internal RAM 104 is a memory used during a normal operation, i.e., when none of the decryption program D723a, the decryption key decryption program D723b, and the decrypted program is executed. A description will be given to the case where the encrypted decryption key is decrypted and stored in the decryption key storing register 702. First, in the state in which the external bus 102 and the internal bus 109 are connected to each other by the bus port 110d, the CPU 103d transfers the encrypted decryption key and the decryption key decryption program D723b in the flash memory 123d to the internal RAM 104 via the external bus 102 and the internal bus 109. Then, after the bus port 110d disconnects the external bus 102 and the internal bus 109 from each other, a DMA controller 118d transfers the encrypted decryption key and the decryption key decryption program D723b from the internal RAM 104 to the internal RAM 105. Thereafter, a security controller 111d disables access from the internal bus 109 to the internal RAM 104 until the decryption key decryption program D723b is completed.

Subsequently, a description will be given to the case where the encrypted program is decrypted and executed. First, the CPU 103d transfers the encrypted program and the decryption program D723a to the internal RAM 104 in the state in which the external bus 102 and the internal bus 109 are connected to each other by the bus port 110d. After the bus port Hod then disconnects the external bus 102 and the internal bus 109 from each other, the DMA controller 118d transfers the encrypted program and the decryption program D723a from the internal RAM 104 to the internal RAM 105. Thereafter, the security controller 111d disables access from the internal bus 109 to the internal RAM 104 until the execution of the decrypted program is completed.

The internal RAM 105 is used during the execution of the decryption key decryption program D723b, the decryption program D723a, and the decrypted program D728b. A description will be given to the case where the encrypted decryption key is decrypted and stored in the decryption key storing register 702. After the bus port 110d disconnects the external bus 102 and the internal bus 109 from each other, the DMA controller 118d transfers the encrypted decryption key and the decryption key decryption program D723b from the internal RAM 104 to the internal RAM 105. During the decryption of the encrypted decryption key, the CPU 103d decrypts the encrypted decryption key by using the internal RAM 105. A description will be given to the case where the encrypted program is decrypted and executed. After the bus port 110d disconnects the external bus 102 and the internal bus 109 from each other, the encrypted program and the decryption program D723a are transferred from the internal RAM 104 to the internal RAM 105. During the decryption of the encrypted program and during the execution of the decrypted program, the CPU 103d decrypts the encrypted program and executes the decrypted program by using the internal RAM 105. While the external bus 102 and the internal bus 109 are connected to each other by the bus port 110d, access from the internal bus 109 to the internal RAM 105 is disabled. Accordingly, the decrypted decryption key D728e, the decrypted program D728a, and data during the execution of these decryption processes, each temporarily stored in the internal RAM 105, are not monitored from the outside.

The public key storing register 106 is a register storing a public key, which is used only for reading. The public key is transferred to the personal computer 128e disposed outside the semiconductor integrated circuit device 701 and used in conjunction with the decryption key encryption program D728c to encrypt the decryption key D728e. The encrypted decryption key is decrypted by using the decryption key decryption program D723b and the secret key stored in the secret key storing register 107.

The secret key storing register 107 is a register storing a secret key, which is used only for reading. The secret key is used when the encrypted decryption key is decrypted by using the secret key.

The decryption key storing register 702 is a register for storing the decryption key D728e such that it is written therein and read therefrom. The decryption key D728e is used in conjunction with the decryption key decryption program D723b to decrypt the encrypted program.

The secret key access port 108d enables the CPU 103d to read the secret key from the secret key storing register 107 only while the decryption key decryption flag 704F is set and the RAM copy flag 113F is reset. Specifically, the CPU 103d enables the reading of the secret key from the secret key storing register 107 only while the decryption key decryption program D723b is initiated, the transfer of the encrypted decryption key and the decryption key decryption program D723b from the internal RAM 104 to the internal RAM 105 is completed, the RAM copy flag 113F is reset, and the encrypted decryption key is decrypted thereafter. At any time other than the above, the reading of the secret key is disabled.

The decryption key access port 703 enables the writing of the decryption key D728e while the decryption key decryption flag 704F is set and the RAM copy flag 113 is reset. The decryption key access port 703 enables the reading of the decryption key D728e while the program decryption execute flag 112F is set and the RAM copy flag 113F is reset. At any time other than the above, the writing and reading of the decryption key D728e are both disabled. Specifically, the writing of the decryption key D728e is enabled while the decryption key decryption program D723b is initiated, the transfer of the encrypted decryption key and the decryption key decryption program D723b from the internal RAM 104 to the internal RAM 105 is completed, the RAM copy flag 113F is reset, and the encrypted decryption key is decrypted thereafter. On the other hand, the reading of the decryption key D728e is enabled while the decryption program D723a is initiated, the transfer of the encrypted program and the decryption program D723a from the internal RAM 104 to the internal RAM 105 is completed, the RAM copy flag 113F is reset, and the encrypted program is decrypted thereafter.

The bus port 110d disconnects the internal bus 109 and the external bus 102 from each other when at least one of the decryption key decryption flag 704F, the program decryption execute flag 112F, and the RAM copy flag 113F is set. During the execution of the decryption key decryption program D723b, the decryption program D723a, and the decrypted program D728a, therefore, the internal bus 109 and the internal bus RAM 105 are not monitored from the outside. In any case other than the above, the internal bus 109 and the external bus 102 are connected to each other.

The security controller 111d is internally provided with a flag storing portion for keeping the decryption key decryption flag 704F, with the program decryption execute flag 112F, and with the RAM copy flag 113F, a CS dispatcher 114d, and the DMA controller 118d.

The decryption key decryption flag 704F is set by the CPU 103 when the decryption key decryption program D723b is initiated and reset by the CPU 103 when the decryption of the decryption key is completed. The decryption key decryption program D723b is initiated, the transfer of the encrypted decryption key and the decryption key decryption program D723b from the internal RAM 104 to the internal RAM 105 is completed, and the RAM copy flag 113F is reset. Thereafter, access to the internal RAM 104 is disabled during the decryption of the encrypted decryption key, while access to the internal RAM 105, to the secret key storing register 107, and to the decryption key storing register 702 is enabled. When the decryption key decryption flag 704F is reset, access to the internal RAM 105, to the secret key storing register 107, and to the decryption key storing register 702 is disabled.

The program decryption execute flag 112F is set by the CPU 103d at the initiation of the decryption program D723a and reset by the CPU 103d at the completion of the execution of the decrypted program. The decryption program D723a is initiated, the transfer of the encrypted program and the decryption program D723a from the internal RAM 104 to the internal RAM 105 is completed, and the RAM copy flag 113F is reset. While the encrypted program is decrypted and the decrypted program is executed thereafter, access to the internal RAM 104 is disabled and access to the internal RAM 105 and to the decryption key storing register 702 is enabled. When the program decryption execute flag 112F is reset, access to the internal RAM 105, to the secret key storing register 107, and to the decryption key storing register 702 is disabled.

The RAM copy flag 113F is set by the CPU 103d at the initiation of the decryption key decryption program D723b or the decryption program D723a and reset by the CPU 103d at the completion of data transfer from the internal RAM 104 to the internal RAM 105.

The CS dispatcher 114d asserts each of the chip select signals 116S and 117S when the RAM copy flag 113F is set, thereby enabling the DMA controller 118d to transfer the encrypted decryption key, the decryption key decryption program D723b, the encrypted program, and the decryption program D723a from the internal RAM 104 to the internal RAM 105. When the decryption key decryption flag 704F or the program decryption execute flag 112F is set and the RAM copy flag 113F is reset, the CS dispatcher 114d negates the chip select signal 116S and transfers the chip select signal 115S as the chip select signal 117S. This enables access to the internal RAM 105 during the decryption of the encrypted decryption key, during the decryption of the encrypted program, and during the execution of the decrypted program. In any case other than those mentioned above, the CS dispatcher 114d transfers the chip select signal 115S as the chip select signal 116S and negates the chip select signal 117S, thereby disabling access to the internal RAM 105 during a normal operation, i.e., when none of the decryption key decryption program D723b, the decryption program D723a, and the decrypted program D728a is executed.

When the RAM copy flag 113F is set, the DMA controller 118d transfers the encrypted decryption key, the decryption key decryption program D723b, the encrypted program, and the decryption program D723a from the internal RAM 104 to the internal RAM 105. When the transfer is completed, the DMA controller 118d resets the RAM copy flag 113F.

The general-purpose register controller 119d resets the general-purpose registers 120d when the decryption key decryption flag 704F or the program decryption execute flag 112F is reset. During the decryption of the encrypted program, therefore, data generated in the general-purpose registers 120d during the execution of the decrypted program is not monitored from the outside.

The decryption key decryption program D723b is kept in the flash memory 123d. When the decryption key encrypted by using the decryption key encryption program D728c and the secret key is decrypted, the decryption key decryption program D723b is transferred to the internal RAM 105 via the internal RAM 104 in the semiconductor integrated circuit device 701 to decrypt the encrypted decryption key in conjunction with the secret key stored in the secret key storing register 107.

The decryption program D723a is kept in the flash memory 123d. When the program encrypted by using the encryption program D728b and the encryption key D728d is decrypted, the decryption program D723a is transferred to the internal RAM 105 via the internal RAM 104 in the semiconductor integrated circuit device 701 to decrypt the encrypted program in conjunction with the decryption key stored in the decryption key storing register 702.

The program D728a is encrypted by using the encryption program D728b and the encryption key D728d and transferred to the semiconductor integrated circuit device 701 via the network 127, the personal computer 126, the USB cable 125, the USB upstream port 124, and the external bus 102. In the semiconductor integrated circuit device 701, the program D728a is decrypted by using the decryption program D723a and the decryption key D728e stored in the decryption key storing register 107.

The encryption program D728b is for encrypting the program D728a by using the encryption key D728d.

The decryption key encryption program D728c is for encrypting the decryption key D728e in conjunction with the public key stored in the public key storing register 106.

The encryption key D728d is for encrypting the program D728a in conjunction with the encryption program D728b.

The decryption key D728e is for decrypting the encrypted program by using the encryption key D728d in conjunction with the decryption program D723a.

Information equipment 740 has the semiconductor integrated circuit device 701, the peripheral equipment 150, the flash memory 123d, and the USB upstream port 124.

A description will be given next to the procedure of decrypting the encrypted decryption key and storing the decryption key D728e in the decryption key storing register 702.

Figure 8:
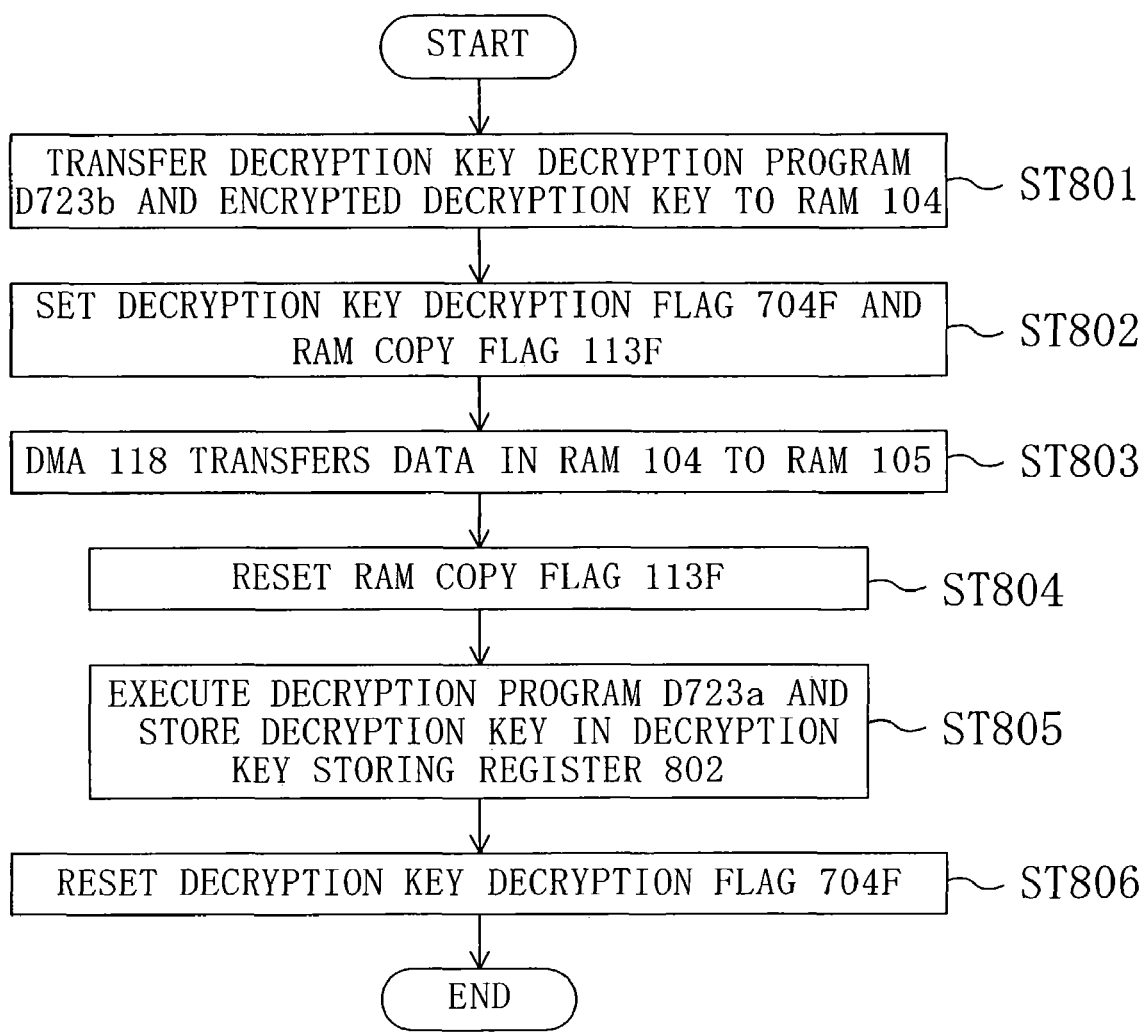
FIG. 8 is a flow chart showing the procedure of decrypting an encrypted decryption key.

FIG. 8 is a flow chart showing the procedure of decrypting the encrypted decryption key in the fourth embodiment.

First, in Step ST801, the CPU 103d transfers the decryption key decryption program D723b and the encrypted decryption key to the internal RAM 104.

When the transfer is completed, the whole process then advances to Step ST802 where the CPU 103d sets the decryption key decryption flag 704F and the RAM copy flag 113F. At this time, the bus port 110d disconnects the internal bus 109 and the external bus 102 from each other.

After the disconnection, the whole process then advances to Step ST803 where the DMA controller 118d transfers the decryption key decryption program D723b and the encrypted decryption key in the internal RAM 104 to the internal RAM 105.

When the transfer is completed, the whole process then advances to Step ST804 where the CPU 103d resets the RAM copy flag 113F. From the resetting of the RAM copy flag 113F on till the completion of Step ST805, which will be described later, the CS dispatcher 114d does not assert the chip select signal 116S.

Next, the whole process advances to Step ST805 where the CPU 103d executes the decryption key decryption program D723b by using the secret key stored in the secret key storing register 107 to decrypt the encrypted decryption key, thereby generates the decryption key D728e, and stores it in the decryption key storing register 702.

Finally, the whole process advances to Step ST806 where the decryption key decryption flag 704F is reset. When the decryption key decryption flag 704F is reset, the general-purpose register controller 119d resets the general-purpose registers 120d. When the decryption key decryption flag 704F is reset, the bus port 110d connects the internal bus 109 and the external bus 102 to each other. The CS dispatcher 114d transfers the chip select signal 115S as the chip select signal 116S and negates the chip select signal 117S.

FIG. 9 shows the respective states of the decryption key decryption flag 704F, the program decryption execute flag 112F, the bus port 110d corresponding to the state of the RAM copy flag 113F, the secret key access port 108d, the decryption key access port 703, and the chip select signals 116S and 117S.

In FIG. 9, "Open" represents the case where the bus port 110d, the secret key access port 108d, and the decryption key access port 703 enable data transfer and "Close" represents the case where data transfer is not enabled, while CS115 represents the case where the chip select signal 115S is transferred as the chip select signals 116S and 117S.

As shown in FIG. 9, when the external bus 102 and the internal bus 109 are connected to each other by the bus port 110d, the secret key storing register 107 and the decryption key decryption register 702 cannot be accessed. On the other hand, the chip select signal 116S is not asserted when the decryption key decryption program D723b is executed and the decryption key D728e is generated. Accordingly, data under decryption, the secret key, and the decryption key D728e are not stored in the internal RAM 104. Since the chip select signal 117S is negated when the external bus 102 and the internal bus 109 are connected to each other by the bus port 110d, data under decryption, the secret key, and the decryption key D728e are not outputted to the outside.

A description will be given next to the procedure of decrypting the encrypted program to generate the program D728a and executing the program D728a with reference to FIG. 10.

Figure 10:
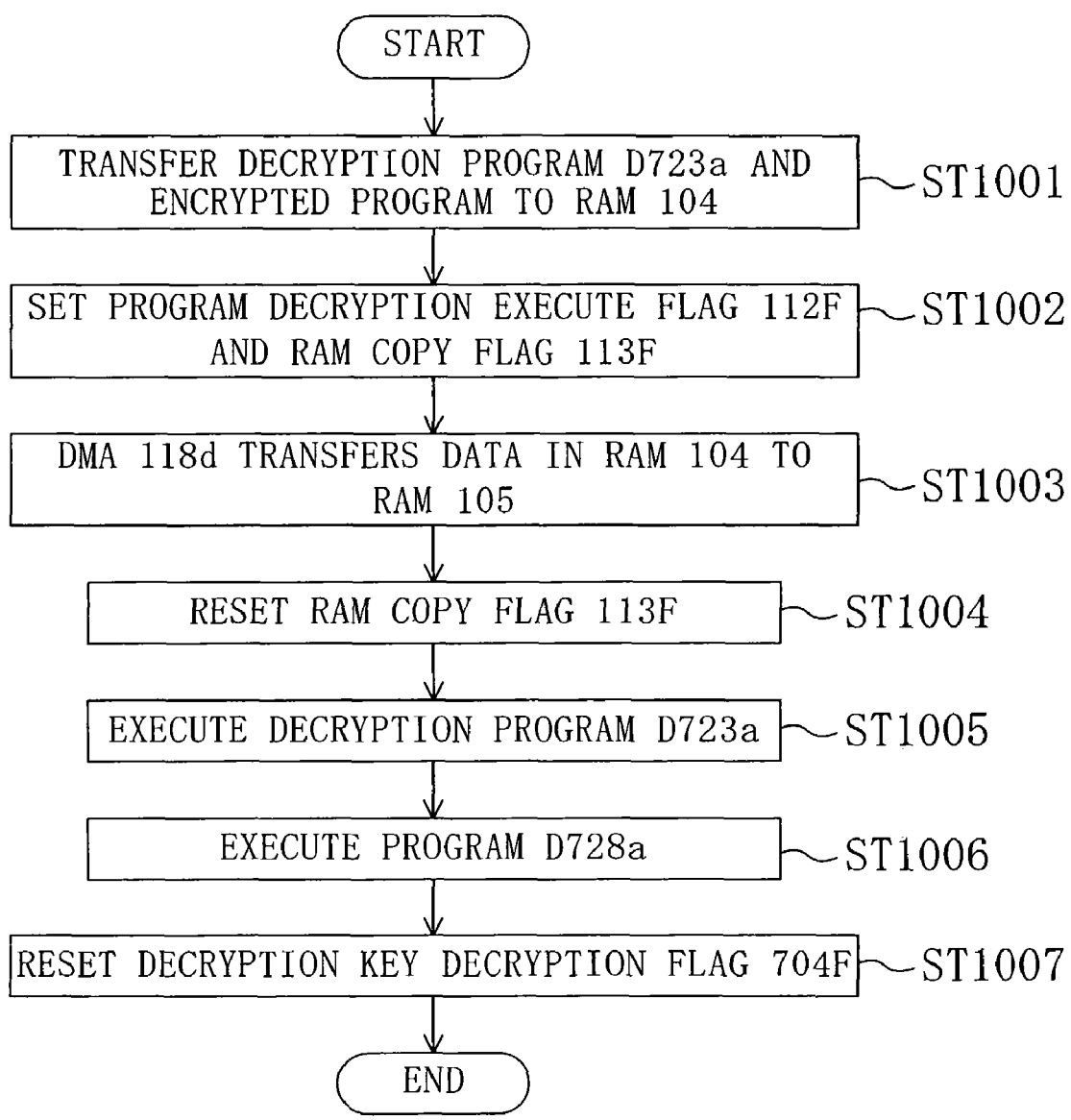
FIG. 10 is a flow chart showing the procedure of decrypting an encrypted program.

FIG. 10 is a flow chart showing the procedure of decrypting the encrypted program in the fourth embodiment.

First, in Step ST1001, the CPU 103d transfers the decryption program D723a and the encrypted program to the internal RAM 104.

When the transfer is completed, the whole process advances to Step ST1002 where the CPU 103d sets the program decryption execute flag 112F and the RAM copy flag 113F. At this time, the bus port 110d disconnects the internal bus 109 and the external bus 102 from each other.

After the disconnection, the whole process advances to Step ST1003 where the DMA controller 118d transfers the decryption program D723a and the encrypted program in the internal RAM 104 to the internal RAM 105.

When the transfer is completed, the whole process advances to Step ST1004 where the CPU 103d resets the RAM copy flag 113F. From the resetting of the RAM copy flag 113F on till the completion of Step ST1006, which will be described later, the CS dispatcher 114d does not assert the chip select signal 116S.

Then, the whole process advances to Step ST1005 where the CPU 103d executes the decryption program D723a by using the decryption key D728e, thereby decrypts the encrypted program, and generates the program D728a. The generated program D728a is written in the internal RAM 105.

Then, the whole process advances to Step ST1006 where the CPU 103d executes the program D728a.

Finally, the whole process advances to Step ST1007 where the CPU 103d resets the program decryption execute flag 112F. When the program decryption execute flag 112F is reset, the general-purpose register controller 119d resets the general-purpose registers 120d. When the program decryption execute flag 112F is reset, the bus port 110d connects the internal bus 109 and the external bus 102 to each other. The CS dispatcher 114d transfers the chip select signal 115S as the chip select signal 116S and negates the chip select signal 117S.

As shown in FIG. 9, the chip select signal 116S is not asserted when the decryption program D723a is executed and the program D728a is generated. Accordingly, data under decryption, the decryption key D728e, and the program D728a are not stored in the internal RAM 104. Since the chip select signal 117S is negated when the external bus 102 and the internal bus 109 are connected to each other by the bus port 110d, data under decryption, the decryption key D728c, and the program D728a are not outputted to the outside.

Thus, it is no more necessary to provide the semiconductor integrated circuit device with an internal nonvolatile memory for keeping the decryption program so that a cost reduction is achieved. Moreover, the encrypted program can be decrypted and executed, while the program and data under decryption are not monitored from the outside. This reduces the probability that the encrypted program is hacked.

In addition, the encryption program and the encryption strength can be selected at the encrypted program transferor.

—Program Delivery Method and System—

FIGS. 11 to 17 are views for illustrating a program delivery system and a program delivery method, which will be described herein below by using the present fourth embodiment as an example.

FIGS. 11 to 17 show data transmission and reception between the semiconductor integrated circuit device 701 (corresponding to a second device) within information equipment used by the program user and the PC 128d (corresponding to a first device) used by the program developer from the encryption of a program till the decryption of the encrypted program.

Figure 11:
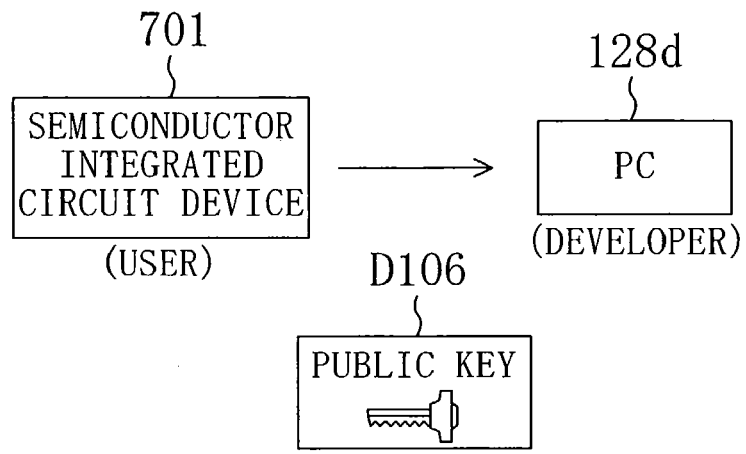
FIG. 11 is a view showing the transfer of a public key from a program user to a program developer.

First, as shown in FIG. 11, the semiconductor integrated circuit device 701 at the user transfers a public key D106 stored in the public key storing register 106 to the PC 128d at the developer.

Figure 12:
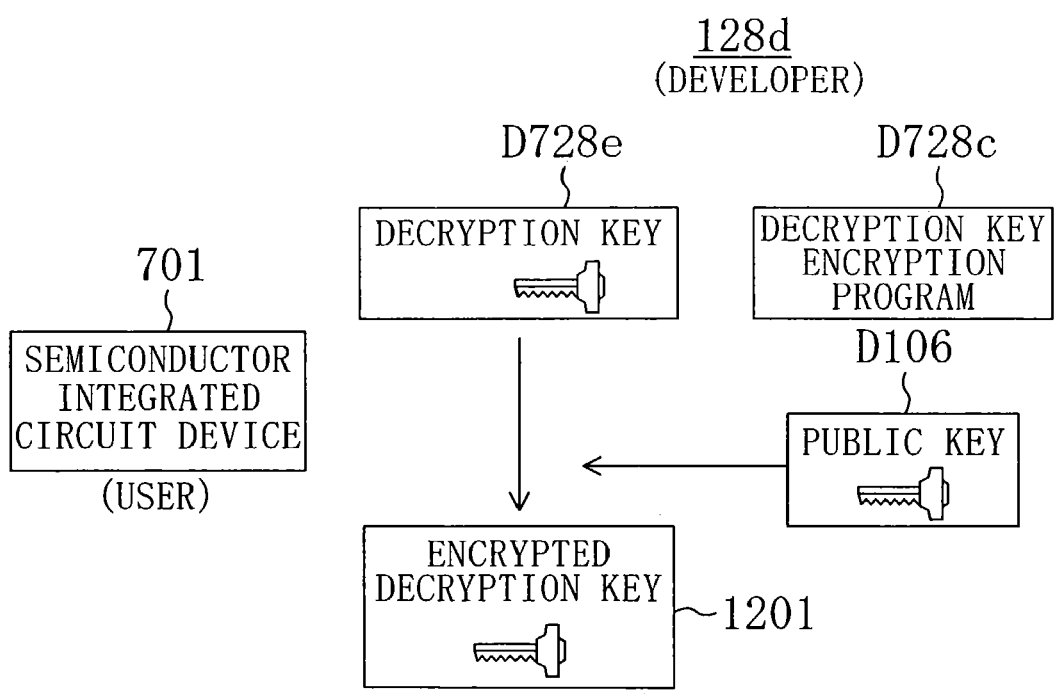
FIG. 12 is a view showing the encryption of a decryption key.

Next, as shown in FIG. 12, the PC 128d at the developer encrypts the decryption key D728e by using the public key D106 and the decryption key encryption program D728c to generate an encrypted decryption key 1201.

Figure 13:
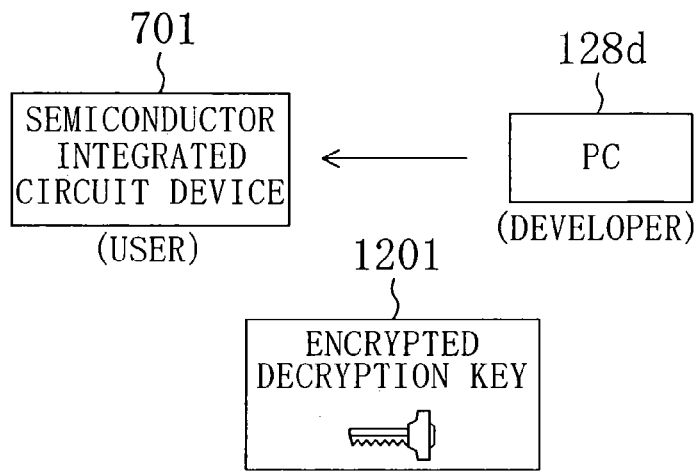
FIG. 13 is a view showing the transfer of an encrypted decryption key from the program developer to the program user.

Next, as shown in FIG. 13, the PC 128d at the developer transfers the encrypted decryption key 1201 to the semiconductor integrated circuit device 701 at the user.

Figure 14:
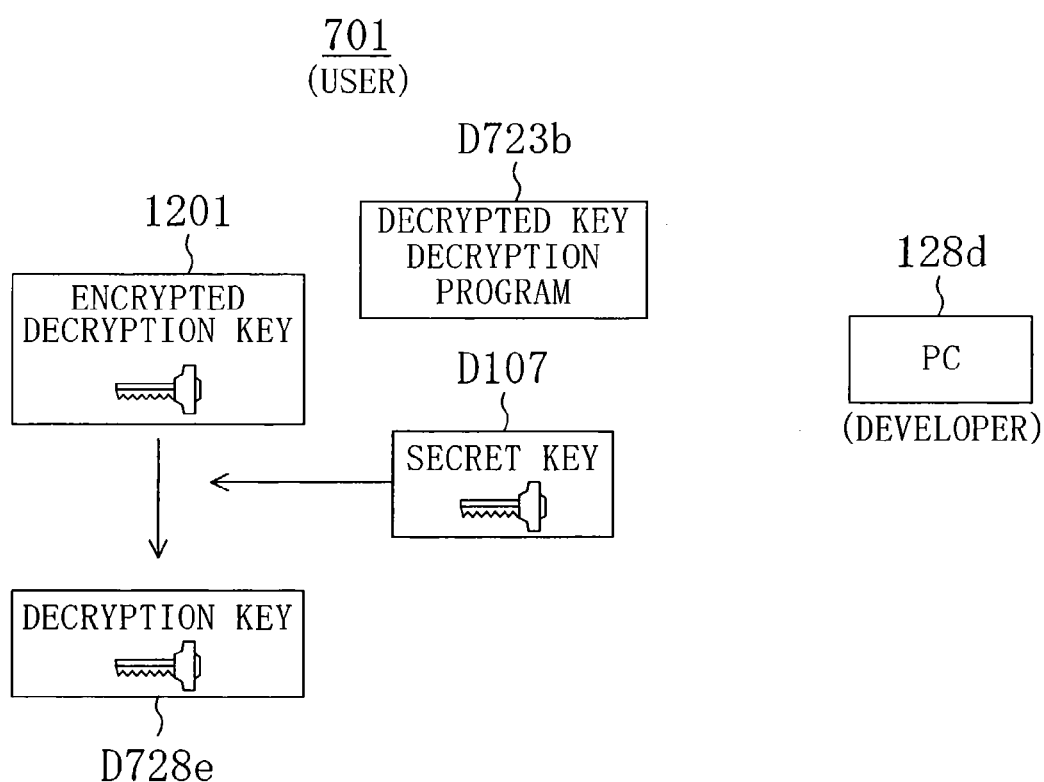
FIG. 14 is a view showing the decryption of an encrypted decryption key.

Next, as shown in FIG. 14, the semiconductor integrated circuit device 701 at the user decrypts the encrypted decryption key 1201 by using the secret key D107 stored in the secret key storing register 107 and the decryption key decryption program D723b and stores the decryption key D728e in the decryption key storing register 702.

Figure 15:
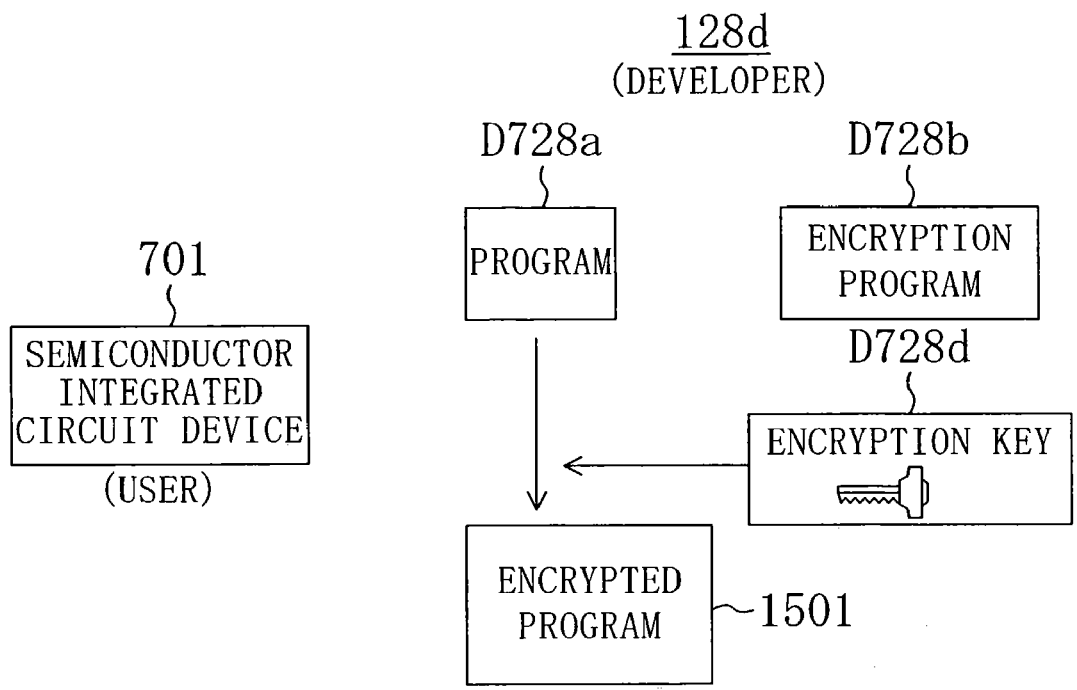
FIG. 15 is a view showing the encryption of a program.

Then, as shown in FIG. 15, the PC 128d at the developer encrypts the program D728a by using the encryption key D728d and the encryption program D728b to generate an encrypted program 1501.

Figure 16:
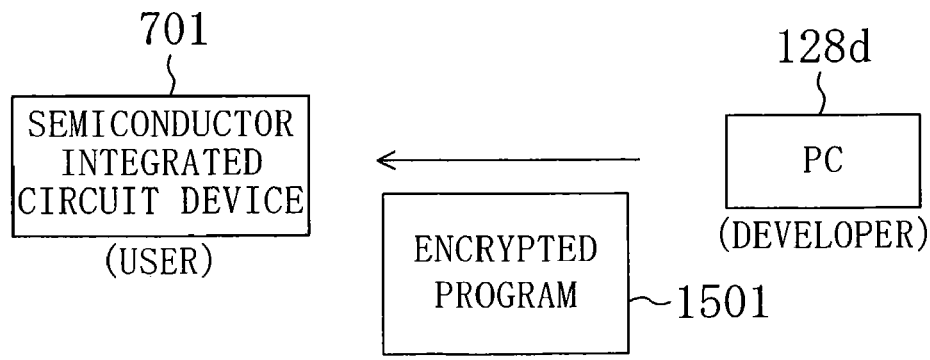
FIG. 16 is a view showing the transfer of an encrypted program from the program developer to the program user.

Next, as shown in FIG. 16, the PC 128d at the developer transfers the encrypted program 1501 to the semiconductor integrated circuit device 701 at the user.

Figure 17:
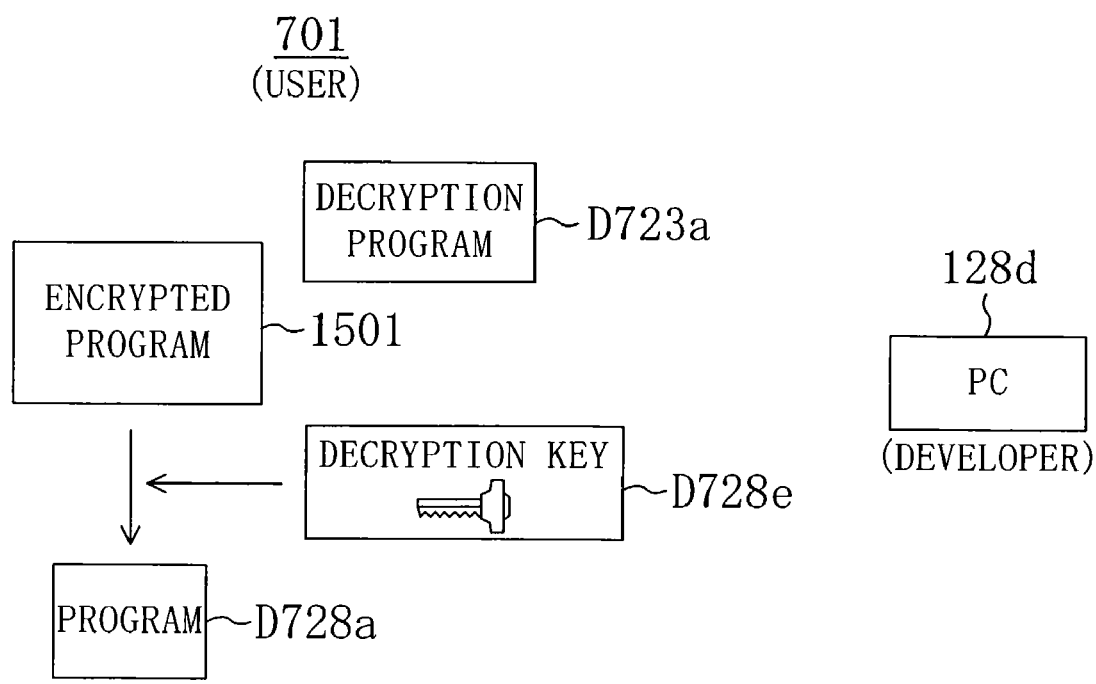
FIG. 17 is a view showing the decryption of an encrypted program.
Figure 18:
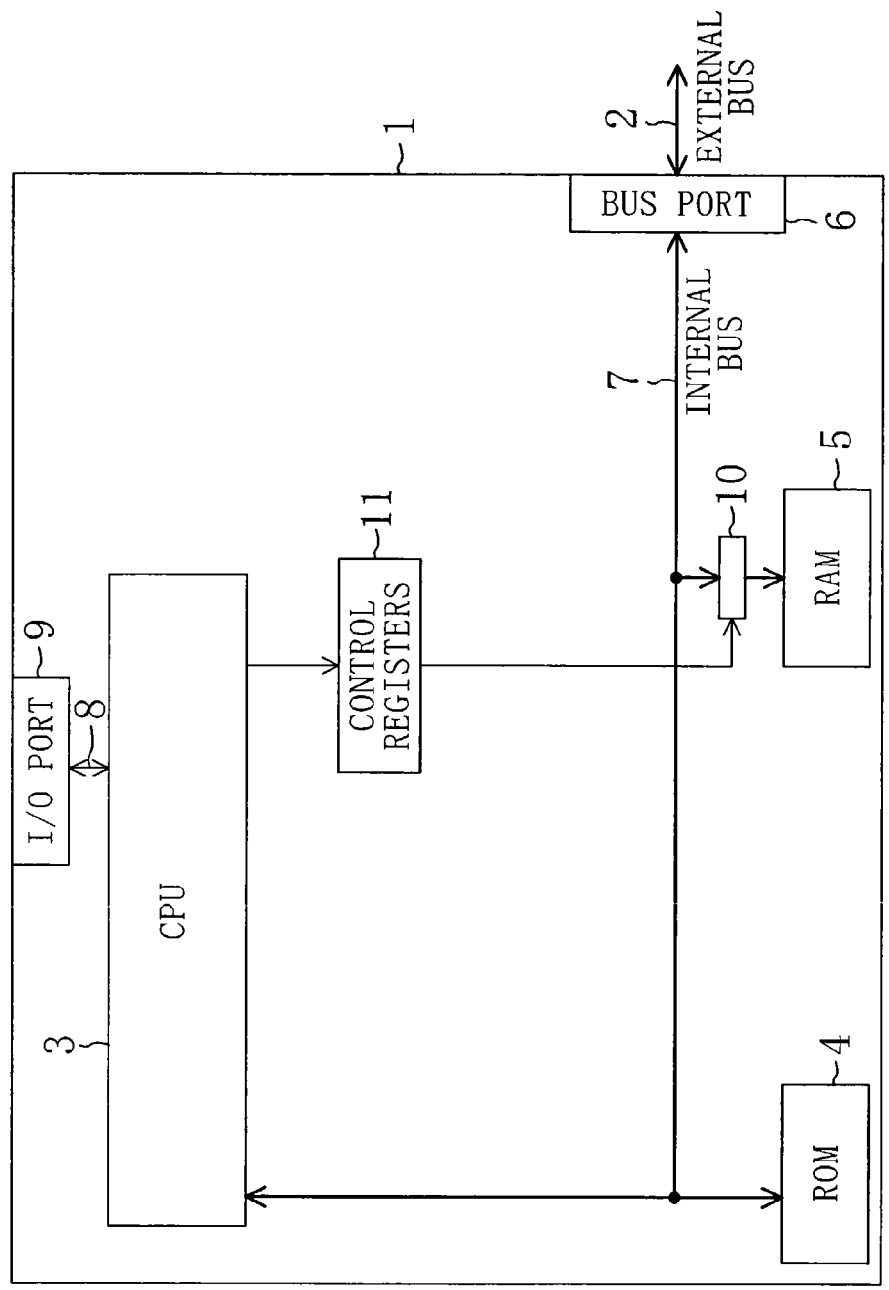
FIG. 18 is a block diagram showing a structure of a conventional semiconductor integrated circuit device.

Finally, as shown in FIG. 17, the semiconductor integrated circuit device 701 at the user decrypts the encrypted program 1501 by using the decryption key D728e and the decryption program D723a and executes the decrypted program D728a.

Thus, the program is encrypted by using the encryption key possessed by the program developer and the encrypted program is delivered to the user. Since the encrypted program can be decrypted by using the decryption key possessed by the program developer, it becomes possible to encrypt the program with an encryption strength desired by the program developer and deliver the encrypted program.

Although each of the first to fourth embodiments has described the case where the control of the internal RAMs 104 and 105 is effected by using the chip select signals in the semiconductor integrated circuit, it will easily be appreciated that the present invention is also similarly practicable in each of the embodiments even if a write enable signal and a read enable signal are used.

What is claimed is:

1. A semiconductor integrated circuit device comprising:
   a first RAM for inputting and outputting data between a bus and itself;
   a second RAM for inputting and outputting data between the bus and itself;
   a secret key holder for holding a secret key;
   a bus port for controlling access from outside to the bus;
   a CPU for storing an encrypted program and a decryption program in the first memory RAM via the bus port, decrypting the encrypted program by using the decryption program and the secret key, and executing the decrypted program; and
   a controller for causing, the bus port to disable access from the outside and enable access to the first and second RAMs when the encrypted program and the decryption program are stored in the first RAM, thereby transferring the encrypted program and the decryption program from the first RAM to the second RAM,
   disabling access to the first RAM when the transfer is completed, and
   disabling access to the second RAM when the decryption and the execution of the decrypted program are completed.

2. The semiconductor integrated circuit device of claim 1, further comprising:
   a secret key access port for controlling access from the CPU to the secret key holder, wherein
   the secret key access port enables access to the secret key holder when the transfer is completed and disables access to the secrete key holder when the execution of the decrypted program is completed.

3. The semiconductor integrated circuit device of claim 1, wherein the CPU includes a register and erases data stored in the register if the execution of the decrypted program is completed.

4. The semiconductor integrated circuit device of claim 1, wherein the controller controls access to the first and second RAMs by controlling chip select signals to the first and second RAMs.

5. The semiconductor integrated circuit device of claim 1, wherein
   the controller includes a flag storing portion for storing first and second flags, enables access to the first and second RAMs when the first flag is set, disables access to the first RAMs when the first flag is reset and the second flag is set, and disables access to the second RAMs when each of the first and second flags is reset,
   the bus port disables access from the outside when at least one of the first and second flags is set, and
   the CPU sets the first and second flags when the encrypted program and the decryption program are inputted to the first RAM, resets the first flag when the transfer is completed, and resets the second flag when the execution of the decrypted program is completed.

6. A semiconductor integrated circuit device comprising:
   a first RAM for inputting and outputting data between a bus and itself;
   a second RAM for inputting and outputting data between the bus and itself;
   a first RAM port connected between the bus and the first RAM to control access from the bus to the first RAM;
   a second RAM port connected between the bus and the second RAM to control access from the bus to the second RAM;
   a secret key holder for holding a secret key;
   a bus port for controlling access from outside to the bus;
   a CPU having a register, the CPU writing an encrypted program and a decryption program in the first RAM via the bus port, decrypting the encrypted program by using the decryption program and the secret key, writing the decrypted program in the second RAM, and executing the decrypted program; and
   a controller for causing the bus port to disable access from the outside to the bus, the first RAM port to disable the writing to the first RAM, and the second RAM port to enable access to the second RAM when the writing to the first memory is completed and
   causing, when the execution of the decrypted program is completed, the CPU to erase data stored in the register and disable access to the secrete key holder, while causing the second RAM port to disable access to the second RAM.

7. A semiconductor integrated circuit device comprising:
   a first RAM for inputting and outputting data between a bus and itself;
   a second RAM for inputting and outputting data between the bus and itself;
   a RAM port connected between the bus and the first memory to control access from the bus to the first RAM;
   a secret key holder for holding a secret key;
   a bus port for controlling access from outside to the bus;
   a CPU having a register, the CPU writing an encrypted program and a decryption program in the first RAM via the bus port, decrypting the encrypted program by using the decryption program and the secret key, writing the decrypted program in the second RAM, and executing the decrypted program; and
   a controller including a RAM initializer for erasing data in the second RAM, the controller causing, when the wiring to the first RAM is completed, the bus port to disable access from the outside to the bus and causing the memory port to disable the writing to the first RAM and
   causing, when the execution of the decrypted program is completed, the CPU to erase data stored in the register and disable access to the secret key holder and causing the RAM initializer to erase the data in the second RAM.

8. A semiconductor integrated circuit device comprising:
   a first RAM for inputting and outputting data between a bus and itself;
   a second RAM for inputting and outputting data between the bus and itself;
   a secret key holder for holding a secret key;
   a decryption key holder for holding a decryption key;
   a bus port for controlling access from outside to the bus;
   a CPU including a register, the CPU performing first storage for storing the encrypted decryption key and a decryption key decryption program in the first RAM via the bus port, performing first decryption for decrypting the encrypted decryption key by using the decryption key decryption program and the secret key, writing the decrypted decryption key in the decryption key holder, performing second storage for storing an encrypted program and a decryption program in the first RAM, performing decryption for decrypting the encrypted program by using the decryption program and the decrypted decryption key, and executing the decrypted program; and a controller for causing, when the first storage to the first RAM is completed, the bus port to disable access from the outside to the bus and enabling access to the first and second RAMs such that the encrypted decryption key and the decryption key decryption program are transferred from the first RAM to the second RAM, enabling, when the transfer is completed, access to the secret key holder and disabling access to the first RAM;

causing, when the first decryption is completed, the CPU to erase data stored in register and disable access to the secret key holder, while disabling access to the second RAM, enabling access to the first RAM, and causing the bus port to enable access from the outside to the bus, causing, when the second storage to the first RAM is completed, the bus port to disable access from the outside to the bus and enabling access to the second RAM such that the encrypted program and the decryption program are transferred from the first RAM to the second RAM, enabling, when the transfer is completed, access to the decryption key holder and disabling access to the first RAM, and causing, when the second decryption and the execution of the decrypted program are completed, the CPU to erase data stored in the register and disable access to the secret key holder and disabling access to the second RAM.

* * * * *